United States Patent
Lee et al.

(10) Patent No.: US 8,654,885 B2
(45) Date of Patent: Feb. 18, 2014

(54) FAST IN-PHASE AND QUADRATURE IMBALANCE CALIBRATION

(75) Inventors: Chaekwan Lee, San Jose, CA (US); Peter A. Thompson, Millbrae, CA (US); Bill Xenakis, Pleasanton, CA (US); Kyung Sup Han, San Ramon, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1036 days.

(21) Appl. No.: 11/810,371

(22) Filed: Jun. 5, 2007

(65) Prior Publication Data
US 2008/0025381 A1 Jan. 31, 2008

Related U.S. Application Data

(60) Provisional application No. 60/811,579, filed on Jun. 6, 2006.

(51) Int. Cl.
*H04L 27/00* (2006.01)

(52) U.S. Cl.
USPC .......................................... 375/295

(58) Field of Classification Search
USPC .................. 375/295–297, 316, 324
See application file for complete search history.

(56) References Cited

U.S. PATENT DOCUMENTS

| 4,953,182 | A | 8/1990 | Chung |
| 6,208,698 | B1 | 3/2001 | Marchesani et al. |
| 6,253,066 | B1 | 6/2001 | Wilhite et al. |
| 6,298,096 | B1 | 10/2001 | Burgin |
| 6,680,648 | B2 * | 1/2004 | Nguyen et al. ............ 330/149 |

(Continued)

FOREIGN PATENT DOCUMENTS

| JP | 4275746 A | 10/1992 |
| JP | H04275746 A | 10/1992 |

(Continued)

OTHER PUBLICATIONS

International Search Report and Written Opinion of the International Searching Authority Dated Jan. 8, 2008, International Application No. PCT/US2007/13459.

(Continued)

*Primary Examiner* — Kevin M Burd
(74) *Attorney, Agent, or Firm* — Tyler J. Overall

(57) ABSTRACT

An embodiment of the present invention includes a technique to calibrate receiver and transmitter in a communication system. N digitized samples I(n) and Q(n) are stored. The N digitized samples represent in-phase and quadrature (I-Q) components, respectively, of a down-converted signal from a receiver. The I-Q components are generated from a quadrature demodulator or modulator having I-Q imbalance. Phase and gain adjustment constants are computed from the N digitized samples to compensate for the I-Q imbalance using a closed form solution.

Another embodiment of the present invention includes a technique to calibrate a transceiver in a communication system without using a calibrated reference receiver. A first test signal at a first frequency is injected to a transmitter having a quadrature modulator with I-Q imbalance. The quadrature modulator has a carrier frequency. The transmitter generates a transmitter signal. The transmitter signal is detected to generate a composite signal having the first test signal and a second test signal at a second frequency twice the first frequency. The composite signal is digitized. I-Q direct current (DC) offset, phase, and gain corrections are computed from the digitized composite signal to correct the I-Q imbalance using a closed form solution.

36 Claims, 15 Drawing Sheets

(56) References Cited

U.S. PATENT DOCUMENTS

| | | |
|---|---|---|
| 6,925,132 B2 | 8/2005 | Song et al. |
| 6,931,343 B2 | 8/2005 | Webster et al. |
| 7,035,345 B2 | 4/2006 | Jeckeln et al. |
| 7,145,962 B2 | 12/2006 | Lee |
| 7,177,372 B2 | 2/2007 | Gu |
| 7,187,725 B2 | 3/2007 | Song et al. |
| 7,313,198 B2 | 12/2007 | Rahman et al. |
| 2005/0018787 A1* | 1/2005 | Saed ............................ 375/296 |
| 2005/0118963 A1 | 6/2005 | Chiu |
| 2005/0123064 A1 | 6/2005 | Ben-Ayun et al. |
| 2007/0253510 A1 | 11/2007 | Danz |

FOREIGN PATENT DOCUMENTS

| | | |
|---|---|---|
| JP | 5130156 A | 5/1993 |
| JP | H06188928 A | 7/1994 |
| JP | 2001211220 A | 8/2001 |
| JP | 2001339452 A | 12/2001 |
| JP | 2005223840 A | 8/2005 |
| RU | 2191477 | 10/2002 |
| WO | 9709833 A1 | 3/1997 |
| WO | 2005125143 A1 | 12/2005 |

OTHER PUBLICATIONS

Taiwan Search Report—TW096120302—TIPO—Aug. 9, 2013.

* cited by examiner

FAST IN-PHASE AND QUADRATURE IMBALANCE CALIBRATION

RELATED APPLICATION

This application claims the benefit of the provisional application, titled "Fast In-phase and Quadrature imbalance calibration", filed Jun. 6, 2006, Ser. No. 60/811,579.

BACKGROUND

1. Field of the Invention

Embodiments of the invention relate to the field of communication, and more specifically, to in-phase and quadrature imbalance calibration.

2. Description of Related Art

Radio frequency (RF) receivers or transmitters employing direct conversion architectures generate in-phase and quadrature (I-Q) analog signals. These signals usually have distortions which limit demodulator or modulator performance. These distortions, called quadrature errors, are caused by the gain and phase imbalances between the I-Q signal components. Imbalance in I-Q signals may induce an image frequency and direct current (DC) offset which interfere with the demodulation or modulation process. To correct the I-Q imbalance, it is necessary to calibrate the communication subsystem. Existing calibration methods typically utilize iterative approaches. These techniques correct the phase error, then the gain error, repeatedly in iterative sweeps.

Existing calibration techniques have a number of disadvantages. First, the iterative approach requires multiple processing passes, resulting in long processing time. This long processing time may cause a communication receiver or transmitter to be out-of-service. For communications services requiring constant bit rates, such as telephony or real-time video, the out-of-service interruption may cause undesirable performance. Second, the iterative nature of the technique is not accurate and achieves poor results, leading to degraded performance.

BRIEF DESCRIPTION OF THE DRAWINGS

Embodiments of the invention may best be understood by referring to the following description and accompanying drawings that are used to illustrate embodiments of the invention. In the drawings.

DESCRIPTION

Figure 1A:
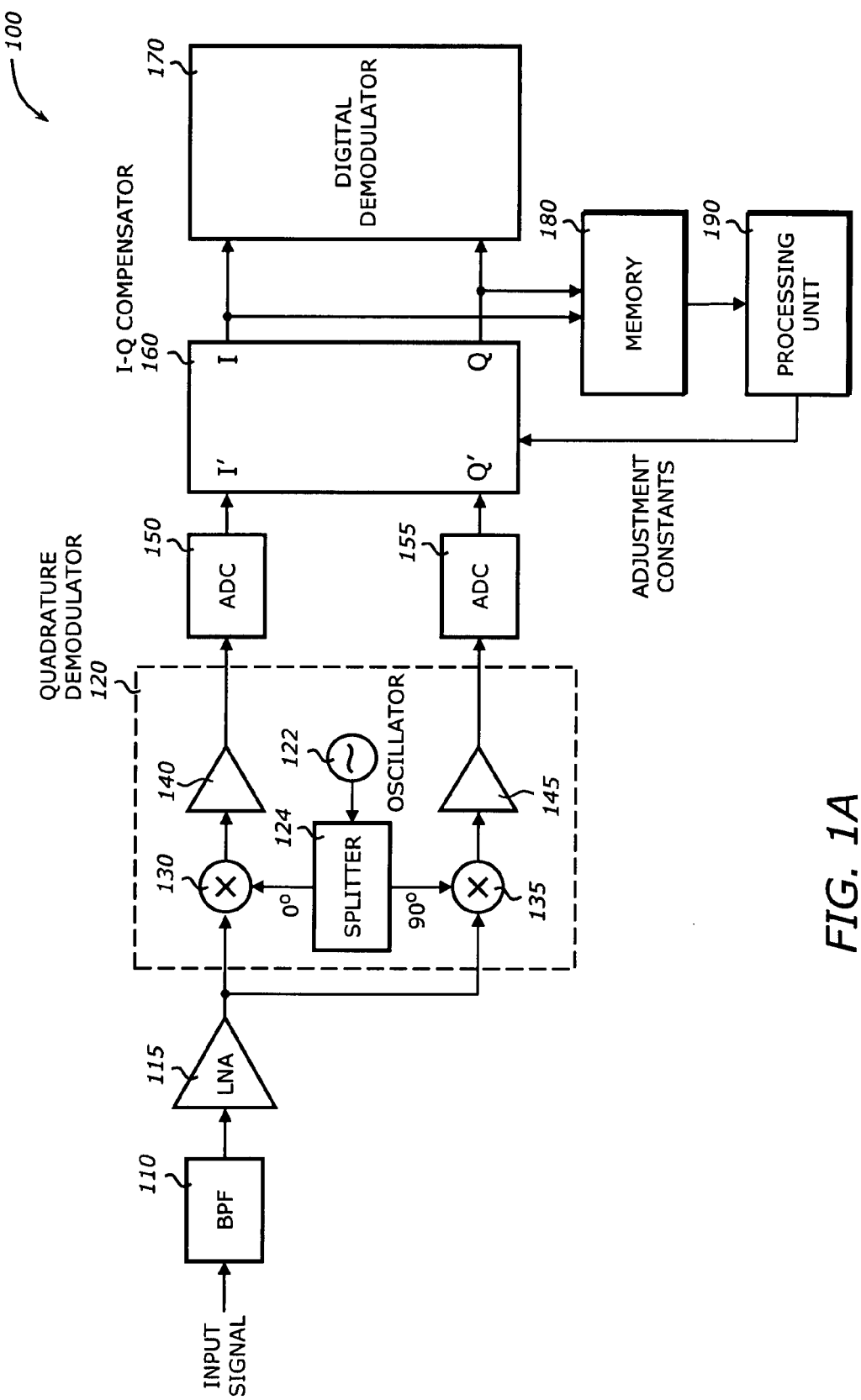
FIG. 1A is a diagram illustrating a receiver subsystem according to one embodiment of the invention.

An embodiment of the present invention includes a technique to calibrate receiver and transmitter in a communication system. N digitized samples I(n) and Q(n) are stored. The N digitized samples represent in-phase and quadrature (I-Q) components, respectively, of a down-converted signal from a receiver. The I-Q components are generated from a quadrature modulator or demodulator having I-Q imbalance. Phase and gain adjustment constants are computed from the N digitized samples to compensate for the I-Q imbalance using a closed form solution.

Another embodiment of the present invention includes a technique to calibrate a transceiver in a communication system without using a calibrated reference receiver. A first test signal at a first frequency is injected to a transmitter having a quadrature modulator with I-Q imbalance. The quadrature modulator has a carrier frequency. The transmitter generates a transmitter signal. The transmitter signal is detected to generate a composite signal having the first test signal and a second test signal at a second frequency twice the first frequency. The composite signal is digitized. I-Q direct current (DC) offset, phase, and gain corrections are computed from the digitized composite signal to correct the I-Q imbalance using a closed form solution.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Embodiments of the invention include a technique to calibrate a receiver or a transmitter in a communication system to compensate for I-Q imbalances in the quadrature demodulator or modulator circuit. The calibration is performed in the digital domain using a closed-form solution to provide fast calibration. The closed-form solution includes application of formulas or equations to compute the adjustment constants or the imbalance corrections. After calibration, the adjustment constants or imbalance corrections may be applied in the compensator circuit to compensate for the I-Q imbalance. The compensation is performed in the digital domain.

In one embodiment, the technique is used to calibrate a receiver. An input signal is injected into the input of the RF receiver. The signal goes through the mixing process in the quadrature demodulator circuit to be down-converted to base-band signal. The base-band signal is then converted to digital samples. The digitized samples are stored in memory to be processed by a processing unit. The processing unit computes the adjustment constants from the stored digitized samples using a closed-form solution. The computation of the adjustment constants therefore takes place in one single pass, involving direct calculations of the constants using formulas. Accordingly, the calibration is fast, efficient, and accurate.

The same procedure may be used to calibrate a transmitter. In this scheme, a calibrated reference receiver is needed to provide the receiver path for the signal. A reference test signal is passed through the transmitter quadrature modulator that has the I-Q imbalance that needs to be compensated. The generated transmitted signal is looped back to the calibrated reference receiver. Since the calibrated reference receiver introduces no distortions, the distortions in the received signal are caused by the transmitter quadrature modulator. The same procedure to compute the phase and gain adjustment constants for the receiver calibration is used.

After the adjustment constants are computed, they may be applied to the receiver or the transmitter to compensate for the I-Q imbalance in the quadrature demodulator or modulator. For a receiver, these constants are applied after the down-conversion by the RF quadrature demodulator on the I-Q signals. For a transmitter, these constants are applied before the up-conversion by the RF quadrature modulator on the I-Q signals to pre-compensate for the I-Q imbalance. In both cases, the compensation is performed in the digital domain.

An alternative method to calibrate a transmitter without using a calibrated reference receiver. This technique utilizes a transmitter power detector built into the RF transceiver circuit. A first test signal is generated to go through the quadrature modulator in the transmitter. The transmitter signal passes through a detector. The detector includes a squarer and a low pass filter. The low pass filter removes the carrier frequency of the quadrature modulator. The detector generates a composite signal having the first signal and a second signal at a second frequency twice the first frequency. The composite signal is then digitized by an analog and digital converter. The digitized samples of the composite signal are stored. A processing unit computes I-Q DC offset, phase, and gain corrections from the digitized composite signal using a closed form solution. The I-Q DC offset, phase, and gain corrections are used to pre-compensate the I-Q balance in a pre-compensation circuit before the quadrature modulator circuit. The computation of the corrections therefore takes place in one single pass, involving direct calculations of the corrections using formulas. Accordingly, the calibration is fast, efficient, and accurate.

FIG. 1A is a diagram illustrating a receiver subsystem 100 according to one embodiment of the invention. The receiver subsystem 100 includes a bandpass filter (BPF) 110, a low-noise amplifier (LNA) 115, a quadrature demodulator circuit 120, I-Q analog-to-digital converters 150 and 155, an I-Q imbalance compensator 160, a digital demodulator 170, a memory 180, and a processing unit 190. The receiver subsystem 100 may include more or less than the above components.

The input signal is received from an RF antenna. The BPF 110 removes unwanted frequencies from the frequency band of interest. The LNA 115 amplifies the filtered signal with proper gain.

The quadrature demodulator 120 down converts the received signal to base-band signal. The quadrature demodulator 120 includes a local oscillator 125, a splitter 127, two mixers 130 and 135, and two buffers 140 and 145. The local oscillator 125 generates a carrier waveform having a carrier frequency. The splitter 127 splits the carrier waveform into two waveforms that are phase shifted by 90°. The mixers 130 and 135 mix, or multiply, the received signal with the phase shifted signals to provide two channels: the in-phase (I) channel and the quadrature (Q) channel. The two buffers 140 and 145 buffer the resulting I-Q components of the quadrature demodulated signal. The quadrature demodulator 120 may have I-Q imbalance that cause signal distortions.

The I-Q ADCs 150 and 155 convert the respective I-Q components from the quadrature demodulator 120 into digital data. The I-Q compensator 160 compensates the I-Q imbalance in the quadrature demodulator 120 to provide corrected I-Q components. The I-Q compensator 160 uses the adjustment constants as computed by the processing unit 190 to perform the compensation. During calibration, the I-Q compensator 160 may be in calibration mode that passes the digitized I-Q components without change. After calibration, the I-Q compensator 160 may be loaded with the adjustment constants and activated to perform the compensation function. The digital demodulator 170 applies digital demodulation to the corrected I-Q components according to the receiver functions.

The memory 180 stores N digitized I-Q samples for processing. It may be any storage device (e.g., fast static random access memory) that can store the digitized I-Q samples at the real-time rate. The size of the memory is selected according to the desired number of digitized samples to be stored.

The processing unit 190 includes a programmable processor that executes programs or instructions to compute the adjustment constants to compensate for the I-Q imbalance. The processing unit 190 provides the adjustment constants to the I-Q compensator 160.

Figure 1B:
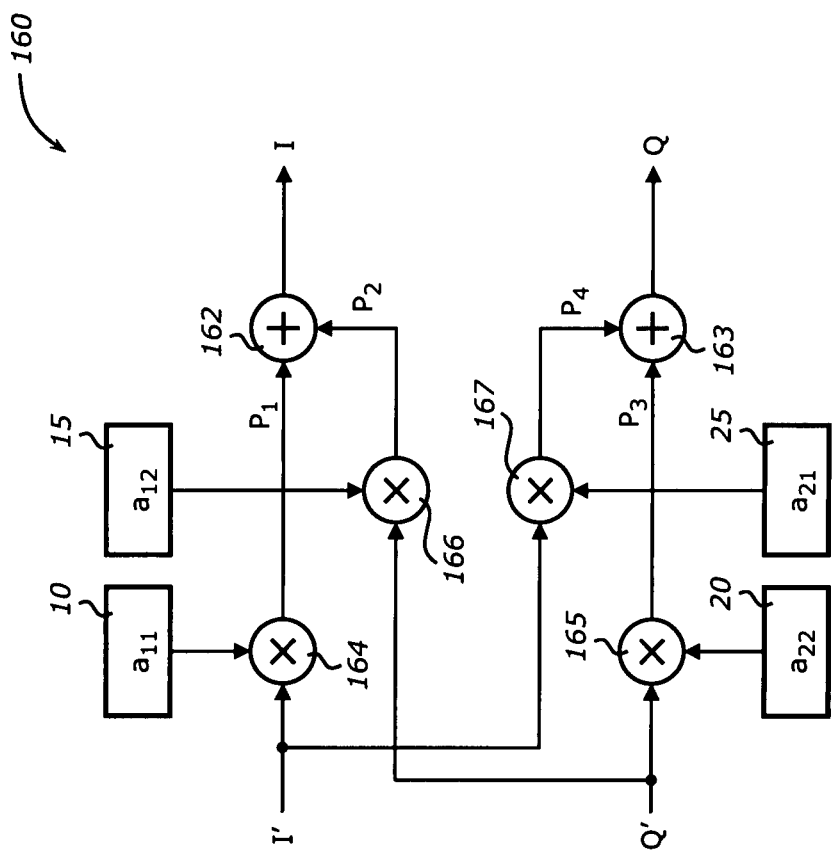
FIG. 1B is a diagram illustrating a compensator for the receiver subsystem according to one embodiment of the invention.

FIG. 1B is a diagram illustrating the compensator 160 for the receiver subsystem in FIG. 1A according to one embodiment of the invention. The compensator 160 includes the adjustment constants $a_{11}$, $a_{12}$, $a_{21}$, and $a_{22}$, 10, 15, 20, and 25, two adders 162 and 163, and four multipliers 164, 165, 166, and 167.

The adjustment constants $a_{11}$, $a_{12}$, $a_{21}$, and $a_{22}$ 10, 15, 20, and 25 are the gain and phase adjustment constants or corrections to compensate for the I-Q imbalance as computed in a closed-form solution by the processing unit 190 during a calibration procedure. They may be stored in storage elements such as registers, buffer memory, or any other storage elements including hardwired data. They are components of the matrix A as computed by the processing unit 190 described in the process 730 shown in FIG. 8C.

The adder 162 adds a first product $P_1$ to a second product $P_2$ to produce the I component in the communication path of the receiver subsystem 100. As described above, the communication path has a quadrature demodulator to translate frequency of the received signal. The quadrature demodulator has I-Q imbalance or distortion that may be compensated or corrected by the gain and phase adjustment constants $a_{11}$, $a_{12}$, $a_{21}$, and $a_{22}$. The adder 163 adds a third product $P_3$ to a fourth product $P_4$ to produce the Q component in the communication path.

The multipliers 164 and 166 multiply the input I' and Q' components in the communication path with the adjustment constants $a_{11}$ and $a_{12}$, 10 and 15, respectively, to produce the first and second products $P_1$ and $P_2$, respectively, to the adder 162. The multipliers 165 and 167 multiply the input Q' and I' components in the communication path with the adjustment constants $a_{22}$ and $a_{21}$, 20 and 25, respectively, to produce the third and fourth products $P_3$ and $P_4$, respectively.

Figure 2A:
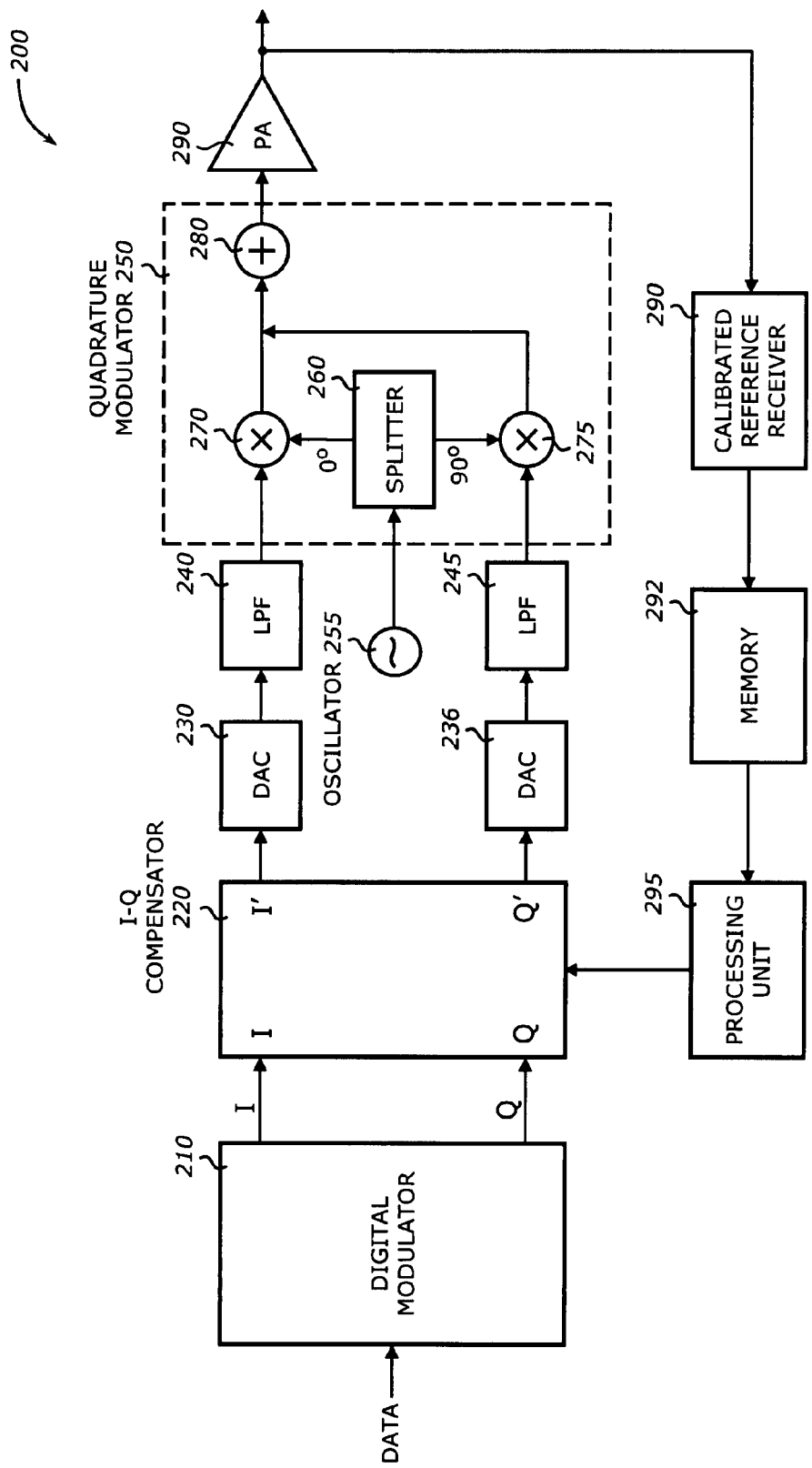
FIG. 2A is a diagram illustrating a transmitter subsystem for calibration using a calibrated reference receiver according to one embodiment of the invention.

FIG. 2A is a diagram illustrating a transmitter subsystem 200 for calibration using a calibrated reference receiver according to one embodiment of the invention. The transmitter subsystem 200 includes a digital modulator 210, an I-Q compensator 220, I-Q digital-to-analog converters (DACs) 230 and 235, I-Q low pass filters (LPFs) 240 and 245, a quadrature modulator 250, a power amplifier (PA) 285, a calibrated reference receiver 290, a memory 292, and a processing unit 295. The transmitter subsystem 200 may include more or less than the above components. During calibration, the calibrated reference receiver 290, the memory 292, and the processing unit 295 are used to compute the adjustment constants used in the I-Q compensator 220. After the adjustment constants are computed, the processing unit 295 loads these constants into the compensator 220. The calibrated reference receiver 290, the memory 292, and the processing unit 295 may then be removed.

The digital modulator 210 performs digital modulation according to the transmitter function. This may include various encoding functions such as error coding, etc. The I-Q compensator 220 applies the adjustment constants or imbalance corrections to pre-compensate for the I-Q imbalance or distortions in the quadrature modulator 250. The I-Q DACs 230 and 235 convert the I-Q digital data to analog base-band signals. The LPFs 240 and 245 low pass filter the analog base-band signals on the respective I-Q channels to remove unwanted frequencies.

The quadrature modulator 250 up-converts the base-band signals to the desired frequency. The quadrature modulator 250 includes a local oscillator 255, a splitter 260, two mixers 270 and 275, and a combiner 280. The local oscillator 255 generates a carrier waveform having a carrier frequency. The splitter 260 splits the carrier waveform into two waveforms that are phase shifted by 90°. The mixers 270 and 275 mix, or multiply, the base-band signals with the phase shifted signals to provide I-Q components of the RF signal to be transmitted. The quadrature modulator 250 may have I-Q imbalance that cause signal distortions. The combiner 280 combines, or adds, the I-Q components of the RF signal into a composite RF output signal.

The PA 285 amplifies the composite RF signal for transmission to an RF antenna. The calibrated reference receiver 290 is a receiver subsystem that has been calibrated to compensate for I-Q imbalance in its quadrature demodulator. It is similar to the receiver subsystem 100. The memory 292 and the processing unit 295 are similar to the memory 180 and the processing unit 190, respectively, shown in FIG. 1A. The memory 292 stores digitized samples of the received signal. The processing unit 295 computes the adjustment constants to be used in the I-Q compensator 220.

Figure 2B:
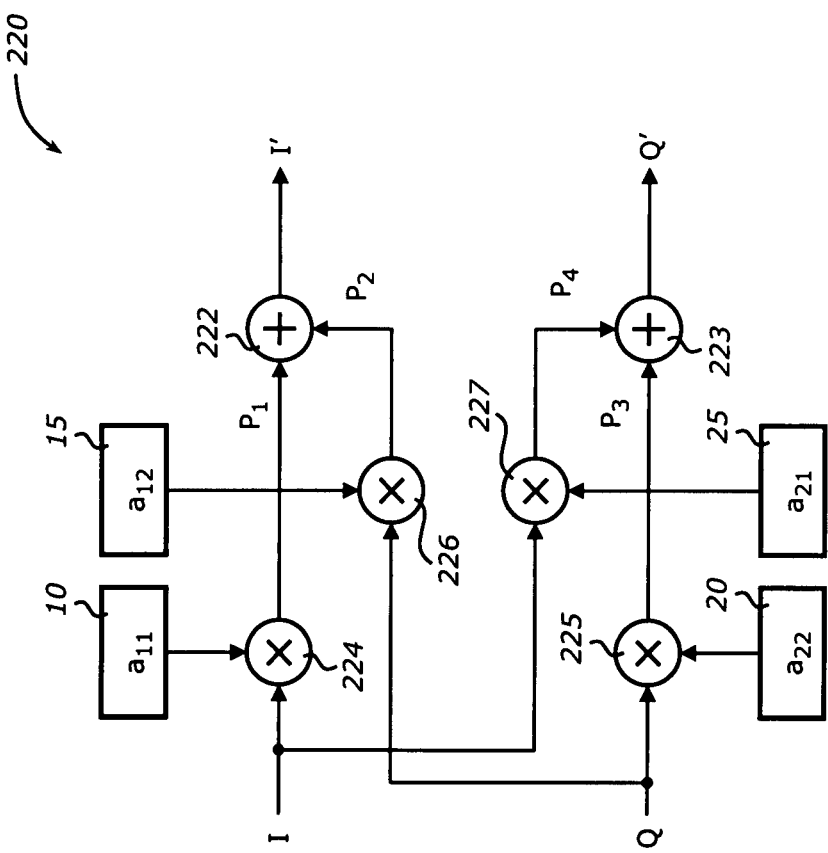
FIG. 2B is a diagram illustrating a compensator for the transmitter subsystem according to one embodiment of the invention.

FIG. 2B is a diagram illustrating the compensator 220 for the transmitter subsystem according to one embodiment of the invention. The compensator 220 includes the adjustment constants $a_{11}$, $a_{12}$, $a_{21}$, and $a_{22}$, 10, 15, 20, and 25, two adders 222 and 223, and four multipliers 224, 225, 226, and 227.

The adjustment constants $a_{11}$, $a_{12}$, $a_{21}$, and $a_{22}$ 10, 15, 20, and 25 are the gain and phase adjustment constants or corrections to compensate for the I-Q imbalance as computed in a closed-form solution by the processing unit 295 during a calibration procedure. These are similar to the constants shown in FIG. 1B. They may be stored in storage elements such as registers, buffer memory, or any other storage elements including hardwired data. They are components of the matrix A as computed by the processing unit 295 as described in the process 730 shown in FIG. 8C.

The adder 222 adds a first product $P_1$ to a second product $P_2$ to produce the I' component in the communication path of the transmitter subsystem 200. As described above, the communication path has a quadrature modulator to translate frequency of the base-band signal. The quadrature modulator has I-Q imbalance or distortion that may be pre-compensated or corrected by the gain and phase adjustment constants $a_{11}$, $a_{12}$, $a_{21}$, and $a_{22}$. The adder 223 adds a third product $P_3$ to a fourth product $P_4$ to produce the Q' component in the communication path.

The multipliers 224 and 226 multiply the input I and Q components in the communication path with the adjustment constants $a_{11}$ and $a_{12}$, 10 and 15, respectively, to produce the first and second products $P_1$ and $P_2$, respectively, to the adder 222. The multipliers 225 and 227 multiply the input Q and I components in the communication path with the adjustment constants $a_{22}$ and $a_{21}$, 20 and 25, respectively, to produce the third and fourth products $P_3$ and $P_4$, respectively.

The calibration of the transmitter subsystem 200 is performed using the calibrated reference receiver 290. When such a receiver is not available, an alternate calibration technique may be employed. This technique may be illustrated in FIG. 3.

Figure 3:
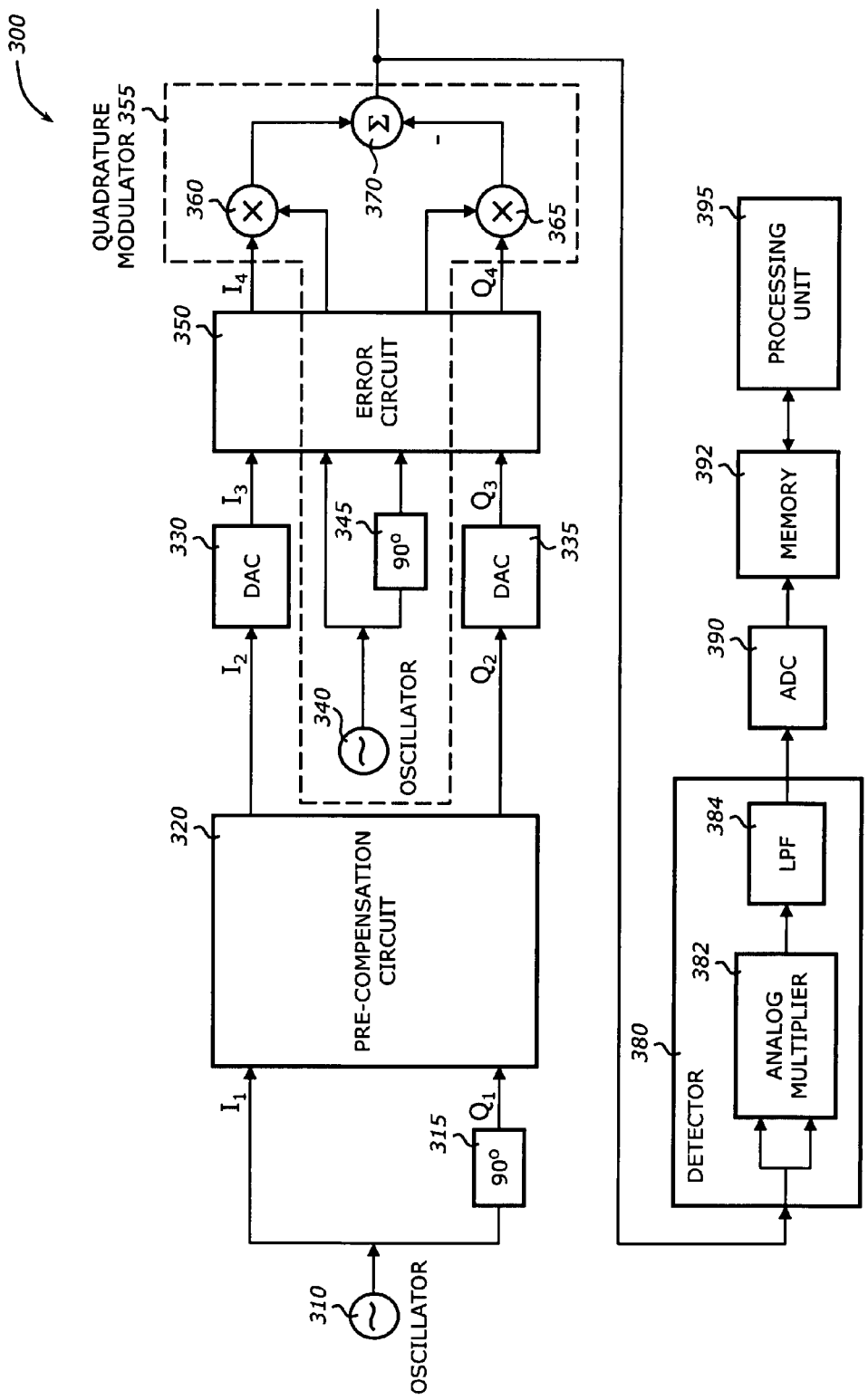
FIG. 3 is a diagram illustrating a transmitter subsystem for calibration without using a calibrated reference receiver according to one embodiment of the invention.

FIG. 3 is a diagram illustrating a transmitter subsystem 300 for calibration without using a calibrated reference receiver according to one embodiment of the invention. The transmitter subsystem 300 includes a signal generator 310, a phase shifter 315, a pre-compensation circuit 320, two I-Q DACs 330 and 335, an error circuit 350, a quadrature modulator 355, a detector 380, an analog-to-digital converter 390, a memory 392, and a processing unit 395. The transmitter subsystem 300 may include more or less than the above components.

The signal generator 310 generates a test signal at a pre-determined frequency. The test signal becomes the I component, i.e., $I_1$ in the communication path. The phase shifter 315 phase shifts the test signal 90° to provide the Q component, e.g., $Q_1$. The signal generator 310 and the phase shifter 315 may be used to emulate a digital modulator normally used in a transmitter. The signal generator 310 therefore may be implemented as a digital signal generator that generates digital data. The test signal may be a single-tone signal that has a single frequency. In other words, it may be generated as a sinusoidal waveform at a pre-determined frequency.

The pre-compensation circuit 320 receives the I-Q components $I_1$ and $Q_1$ of the modulator as emulated by the signal generator 310 and the phase shifter 315 to generate pre-compensated I-Q components $I_2$ and $Q_2$ to the I-Q DACs 330 and 335, respectively. The pre-compensation circuit 320 uses compensation constants to compensate for the I-Q imbalance in the quadrature modulator 355. The compensation constants are computed using a closed-form solution in a calibration procedure.

The I-Q DAC2 330 and 335 convert the respective I-Q digital data $I_2$ and $Q_2$ from the pre-compensation circuit 320 to analog I-Q base-band signals $I_3$ and $Q_3$, respectively. The error circuit 350 models the I-Q imbalance in terms of DC offset, gain error, and phase error.

The quadrature modulator 355 up-converts the base-band signals to the desired frequency. The quadrature modulator 355 includes a local oscillator 340, a phase shifter 345, two mixers 360 and 365, and a combiner 370. The local oscillator 340 generates a carrier waveform having a carrier frequency. The original carrier waveform corresponds to the I component. The phase shifter 345 phase shifts the carrier waveform by 90° to correspond to the Q component. The mixers 360 and 365 mix, or multiply, the base-band signals as passed by the error circuit 350 with the original and the phase shifted signals to provide I-Q components of the RF signal to be transmitted. The quadrature modulator 355 may have I-Q imbalance that cause signal distortions. The combiner 370 combines, or adds, the I-Q components of the RF signal into a transmitter signal.

During calibration, the transmitter signal from the quadrature modulator 355 is fed to the detector 380. The detector 380 generates a composite signal having the first signal as the test signal first and second frequencies from the transmitter signal, the second frequency being twice the first frequency. The detector 380 includes an analog multiplier 382 and a low-pass filter (LPF) 384. The analog multiplier 382 multiplies the transmitter signal to itself, or squares the transmitter. If the transmitter signal contains the test signal which is a single-tone sinusoidal signal, the squaring introduces an additional second test signal having a second frequency which is twice the frequency of the test signal. The LPF 384 has a corner frequency at approximately above the second frequency. Since the first frequency is much less than the carrier frequency, the second frequency is also much less than the carrier frequency. The LPF 384 therefore removes the carrier frequency while passing the first and second signals. The magnitudes and phases of the first and second signals provide a relationship with the DC offset, phase and gain errors due to the I-Q imbalance. The ADC 390 converts the analog signal from the detector to digital data to provide digitized samples of the composite signal. The digitized samples are used to compute the compensation constants.

The memory 392 and the processing unit 395 are similar to the memory 292 and the processing unit 295, respectively, shown in FIG. 2A. The memory 392 stores digitized samples of the composite signal. The processing unit 395 computes the compensation constants to be used in the pre-compensator 320.

Figure 4:
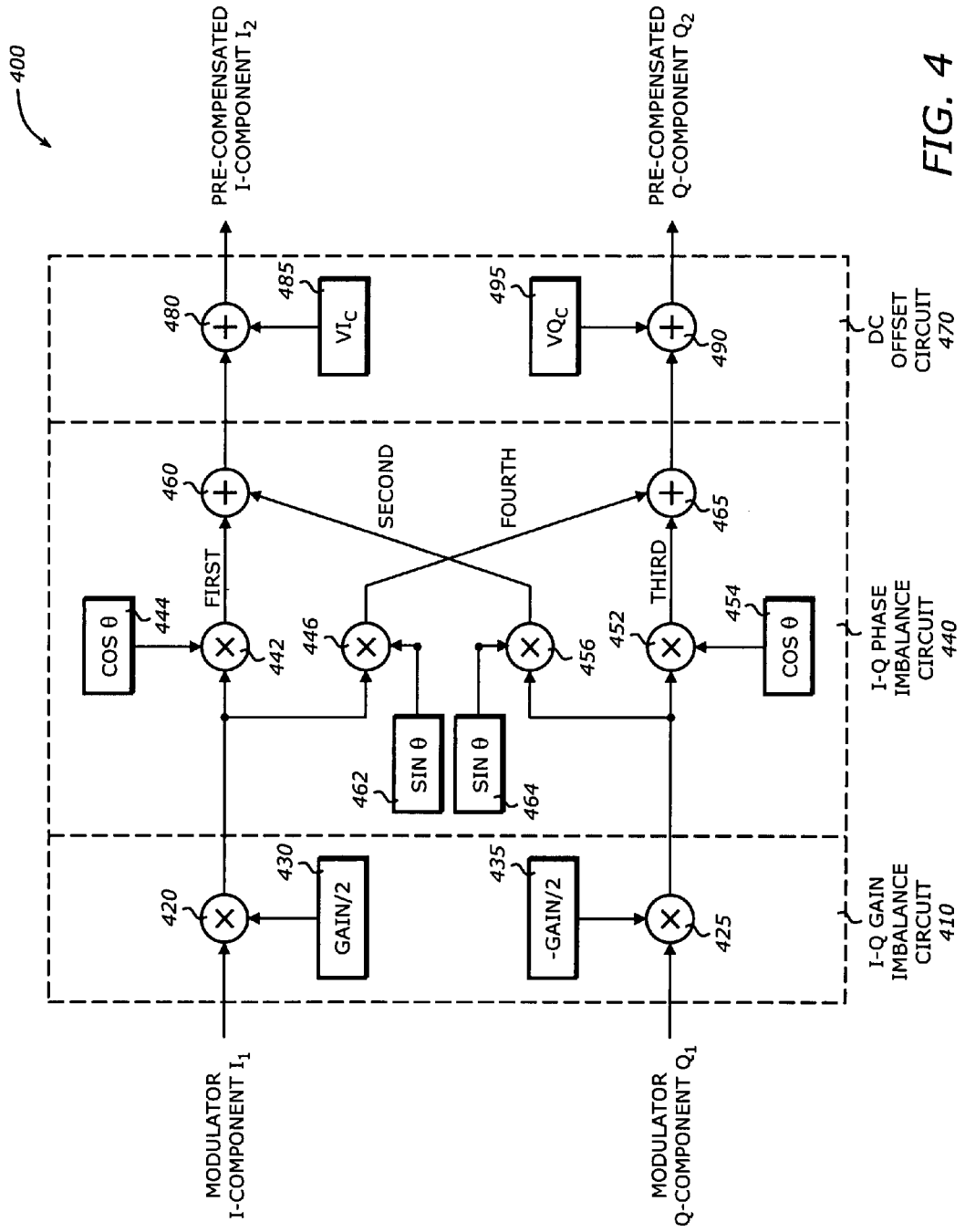
FIG. 4 is a diagram illustrating a pre-compensation circuit according to one embodiment of the invention.

FIG. 4 is a diagram illustrating the pre-compensation circuit 320 shown in FIG. 3 according to one embodiment of the invention. The includes an I-Q gain imbalance circuit 410, an I-Q phase imbalance circuit 440, and a DC offset circuit 470.

The I-Q gain imbalance circuit 410 generates I-Q gain pre-compensated components. It includes I-Q gain multipliers 420 and 425 to multiply the modulator I-Q components $I_1$ and $Q_1$ with I-Q gain compensation constants 430 and 435 to produce the I-Q gain pre-compensated components. The I-Q gain compensation constants 430 and 435 are GAIN/2 and –GAIN/2, respectively. The value of GAIN is the $\Delta G_c$ as shown in FIG. 10B and computed as described in the associated description.

The I-Q phase imbalance circuit 440 generates I-Q gain and phase pre-compensated components from the I-Q gain pre-compensated components. It includes multipliers 442, 446, 452, and 456, and two adders 460 and 465.

The multipliers 442 and 456 multiply the I-Q gain pre-compensated components with I-Q phase compensation constants 444 and 464, respectively, to produce first and second products, respectively. The I-Q phase compensation constants 444 and 464 are cos θ and sin θ, respectively. The value of the phase θ is the $\Delta\phi_c$ as shown in FIG. 10B and computed as described in the associated description.

The multipliers 452 and 446 multiply the Q-I components with the Q-I phase compensation constants 454 and 462, respectively, to produce the third and fourth products, respectively. The Q-I phase compensation constants 454 and 462 are cos θ and sin θ, respectively. The value of the phase θ is the $\Delta\phi_c$ as shown in FIG. 10B and computed as described in the associated description.

The adder 460 adds the first product to the second product to produce the I gain and phase pre-compensated component. The adder 465 adds the third product to the fourth product to produce the Q gain and phase pre-compensated component.

The DC offset circuit 470 generated the imbalance pre-compensated I-Q components. It includes I-Q DC offset adders 480 and 490 to add the I-Q gain and phase pre-compensated components to I-Q DC offset compensation constants 485 and 495, respectively, to produce the pre-compensated I-Q components. The I-Q DC offset compensation constants 485 and 495 are $VI_c$ and $VQ_c$, respectively. The $VI_c$ and $VQ_c$ are the $VI_c$ and $VQ_c$, respectively, shown in FIG. 10B and computed as described in the associated description.

Figure 5:
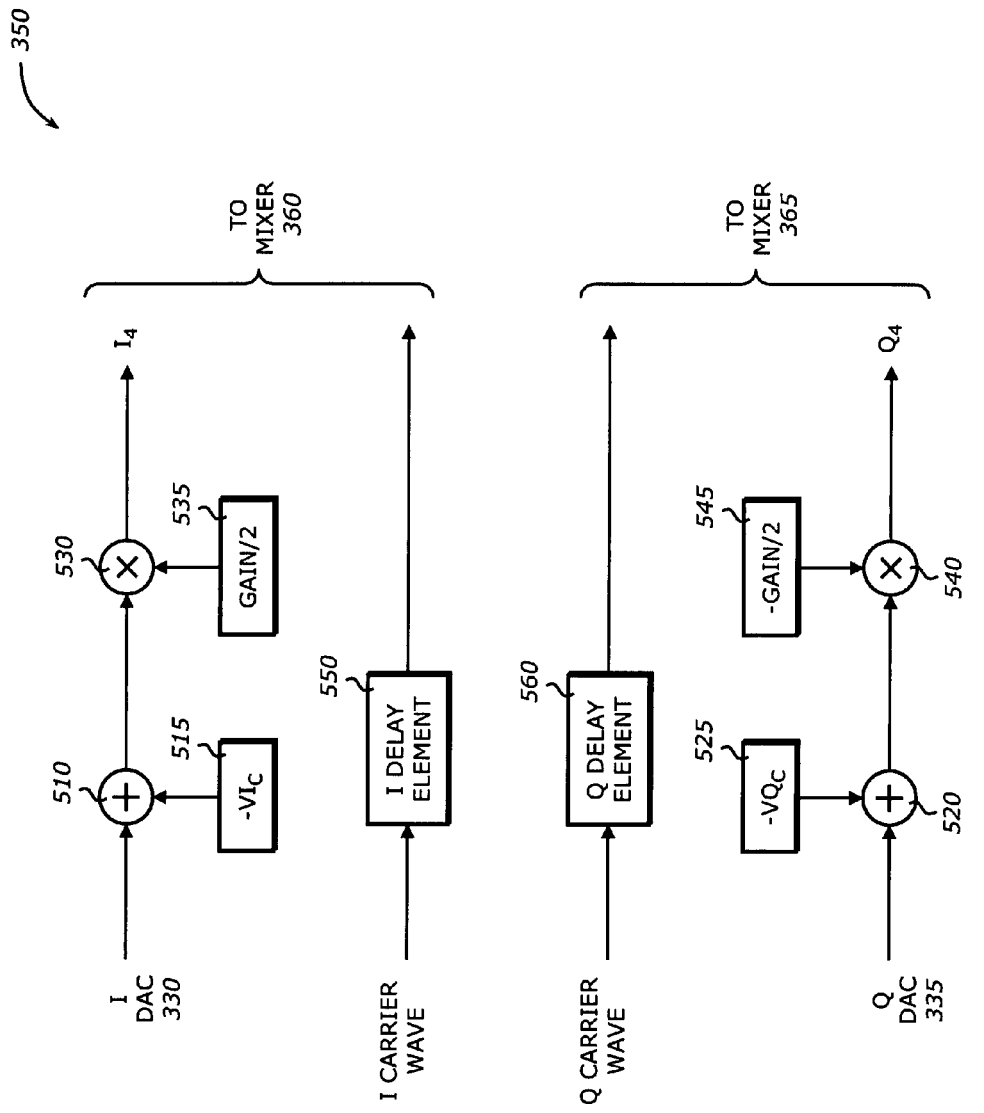
FIG. 5 is a diagram illustrating an error circuit according to one embodiment of the invention.

FIG. 5 is a diagram illustrating the error circuit 350 shown in FIG. 3 according to one embodiment of the invention. The error circuit 340 includes two adders 510 and 520, two multipliers 530 and 540, and two I-Q delay elements 550 and 560.

The adders subtract I-Q DC offset compensation constants 515 and 525 from corresponding outputs of the I-Q DACs 330 and 335 to generates first and second differences, respectively. The I-Q DC offset compensation constants 515 and 525 are $VI_c$ and $VQ_c$, respectively.

The multipliers 530 and 540 multiply the first and second differences with negatives of I-Q gain compensation constants 535 and 545, respectively, to produce I-Q inputs $I_4$ and $Q_4$ to the mixer circuit in the quadrature modulator 355. The I-Q gain compensation constants 535 and 545 are GAIN/2 and –GAIN/2, respectively. The I-Q delay elements 550 and 560 provide I-Q phase errors to the I-Q carrier wave components from the oscillator 340.

Figure 6:
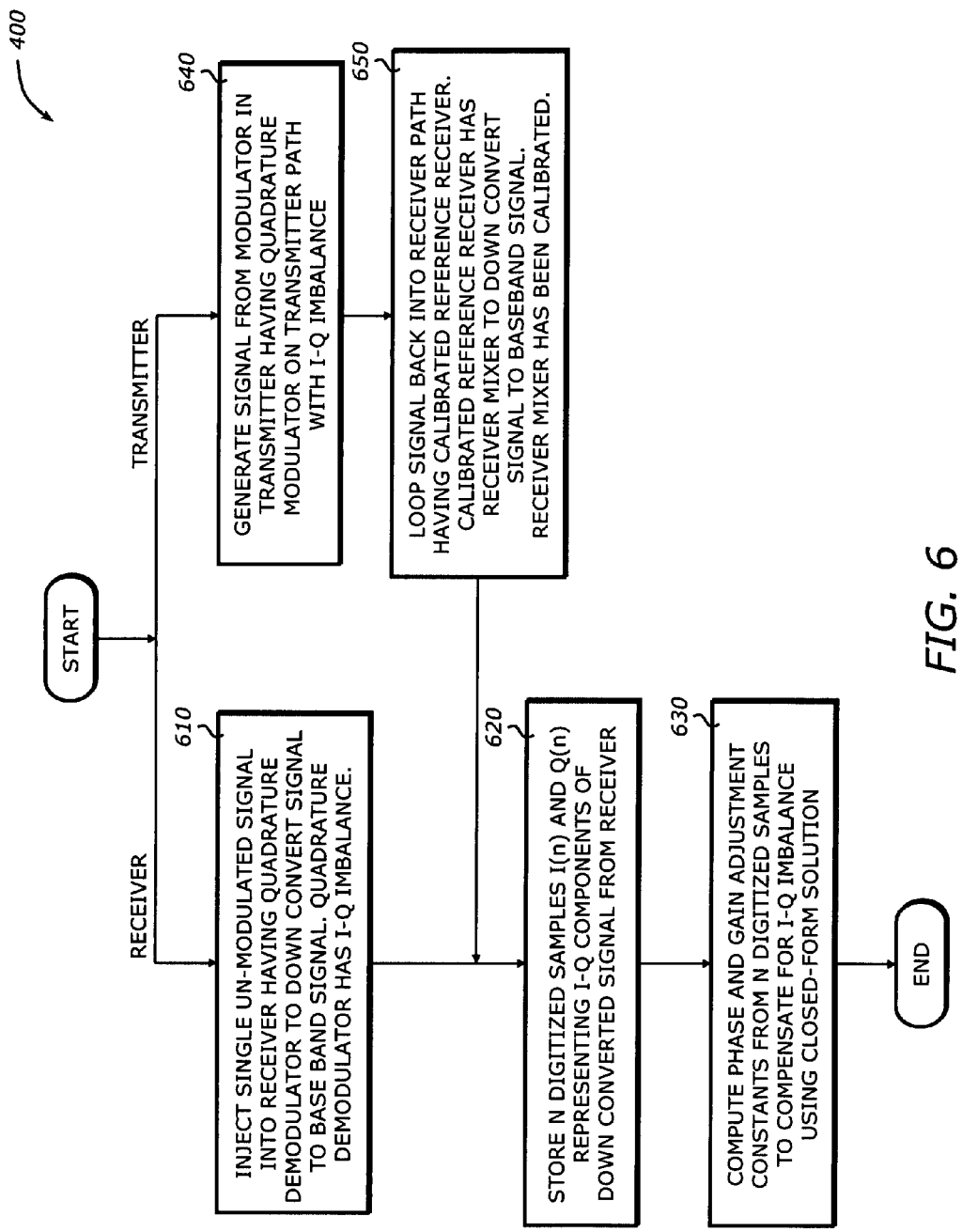
FIG. 6 is a flowchart illustrating a process to perform calibration according to one embodiment of the invention.

FIG. 6 is a flowchart illustrating a process 600 to perform calibration according to one embodiment of the invention.

Upon START, the process 600 determines if the calibration is for a receiver or a transmitter. If the calibration is for a receiver, the process 600 injects a single un-modulated signal into the receiver (Block 610). The receiver has a quadrature demodulator to down convert the signal to base-band signal. The quadrature demodulator has the I-Q imbalance that may need to be compensated or adjusted. Next, the process 600 stores N digitized samples I(n) and Q(n), where n is the sample index, representing the I-Q components, respectively, of the down-converted signal from the receiver (Block 620). The I-Q components are generated from the quadrature demodulator.

Then, the process 600 computes phase and gain adjustment constants from the N digitized samples to compensate for the I-Q imbalance using a closed form solution (Block 630). The process 630 is explained in FIG. 7. The process 600 is then terminated.

If the calibration is for a transmitter, the process 600 generates a signal from a modulator in the transmitter (Block 640). The transmitter has the quadrature modulator on a transmitter path with the I-Q imbalance. Next, the process 600 loops the signal back into a receiver path having a calibrated reference receiver (Block 650). The calibrated reference receiver has a receiver mixer to down convert the signal to base-band signal. The receiver mixer has been calibrated such that it does not have I-Q imbalance. The I-Q imbalance embedded in the signal, therefore, is from the transmitter that is being calibrated. The process 600 then proceeds to block 620 to compute the adjustment constants for the transmitter using the closed-form solution in the same manner as the solution for receiver calibration except that the adjustment constants are now used for the transmitter.

Figure 7:
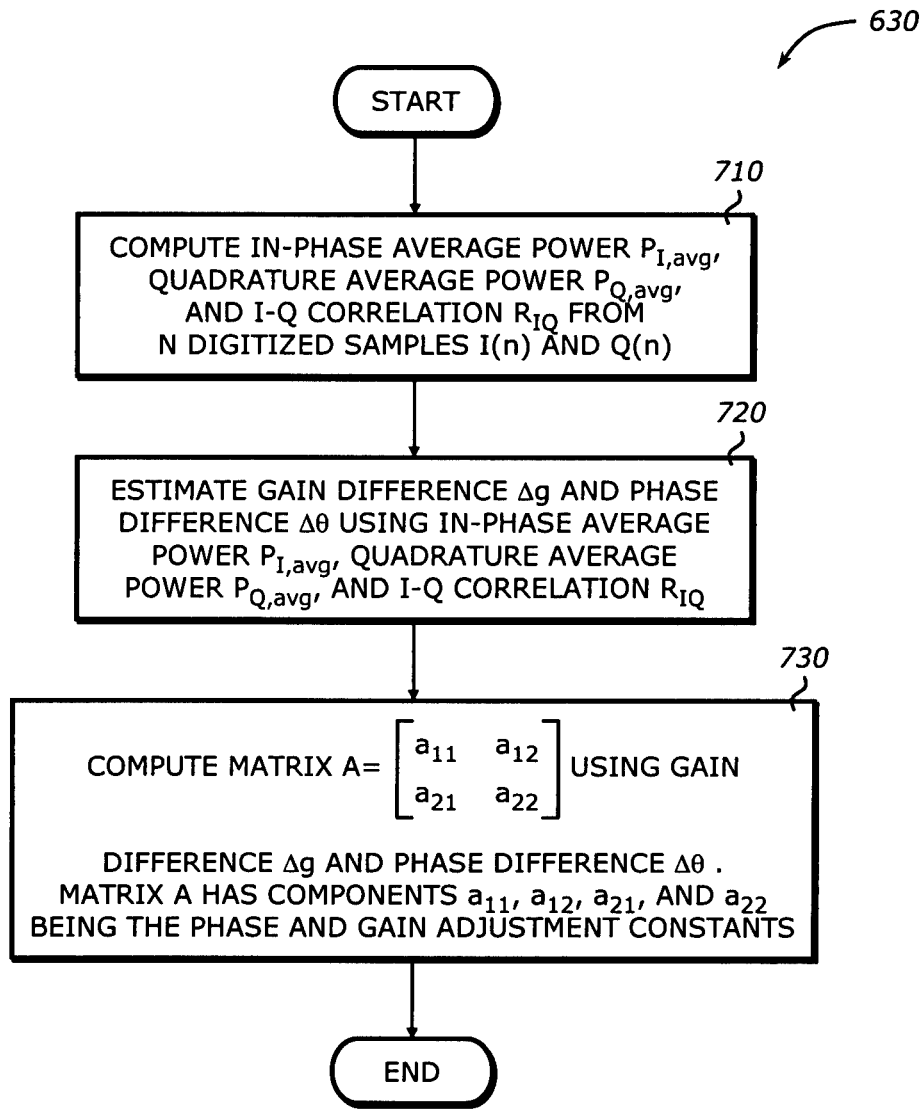
FIG. 7 is a flowchart illustrating a process to compute the phase and gain adjustment constants according to one embodiment of the invention.

FIG. 7 is a flowchart illustrating the process 630 shown in FIG. 6 to compute phase and gain adjustment constants according to one embodiment of the invention.

Upon START, the process 630 computes the in-phase average power $P_{I,avg}$, the quadrature average power $P_{Q,avg}$, and the I-Q correlation $R_{IQ}$ from the N digitized samples I(n) and Q(n) (Block 710). Next, the process 630 estimates the gain difference $\Delta g$ and the phase difference $\Delta \phi$ using the in-phase average power $P_{I,avg}$, the quadrature average power $P_{Q,avg}$, and the I-Q correlation $R_{IQ}$ (Block 720). Then, the process 630 computes a matrix $$A = \begin{bmatrix} a_{11} & a_{12} \\ a_{21} & a_{22} \end{bmatrix}$$

using the gain difference $\Delta g$ and the phase difference $\Delta \phi$ (Block 730). The matrix A has components $a_{11}$, $a_{12}$, $a_{21}$, and $a_{22}$ being the phase and gain adjustment constants. The process 630 is then terminated.

Figure 8A:
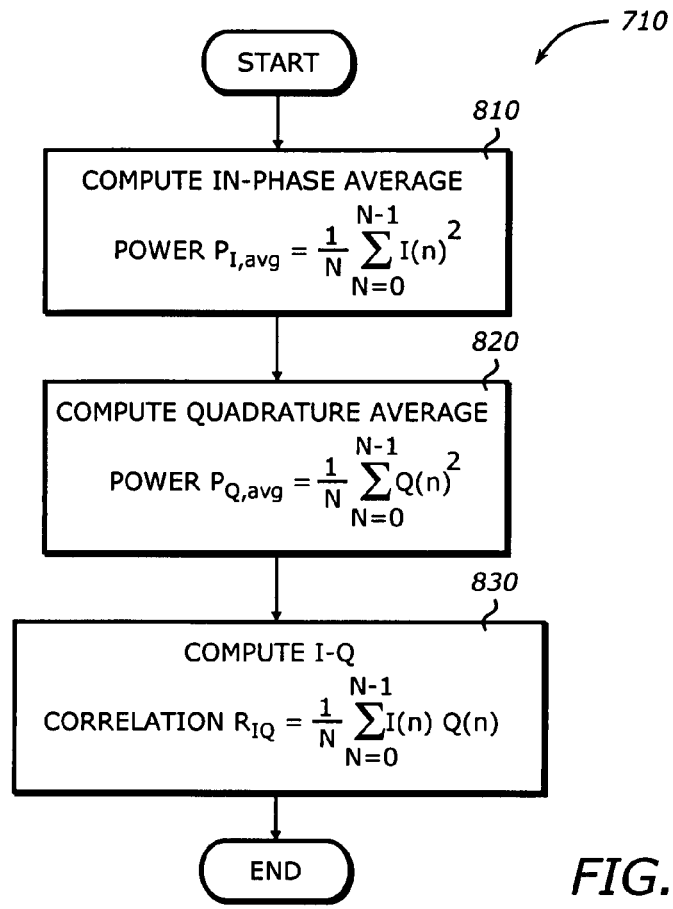
FIG. 8A is a flowchart illustrating a process to compute I-Q average power and I-Q correlation according to one embodiment of the invention.

FIG. 8A is a flowchart illustrating the process 710 shown in FIG. 7 to compute the I-Q average powers and the I-Q correlation according to one embodiment of the invention.

Upon START, the process 710 computes the in-phase average power $P_{I,avg}$ (Block 810), the quadrature average power $P_{Q,avg}$ (Block 820), and the I-Q correlation $R_{IQ}$ (Block 830) according to the following equations:

$$P_{I,avg} = \frac{1}{N} \sum_{n=0}^{N-1} I(n)^2 \quad (1)$$

$$P_{Q,avg} = \frac{1}{N} \sum_{n=0}^{N-1} Q(n)^2 \quad (2)$$

$$R_{IQ} = \frac{1}{N} \sum_{n=0}^{N-1} I(n)Q(n) \quad (3)$$

The process 710 is then terminated.

Figure 8B:
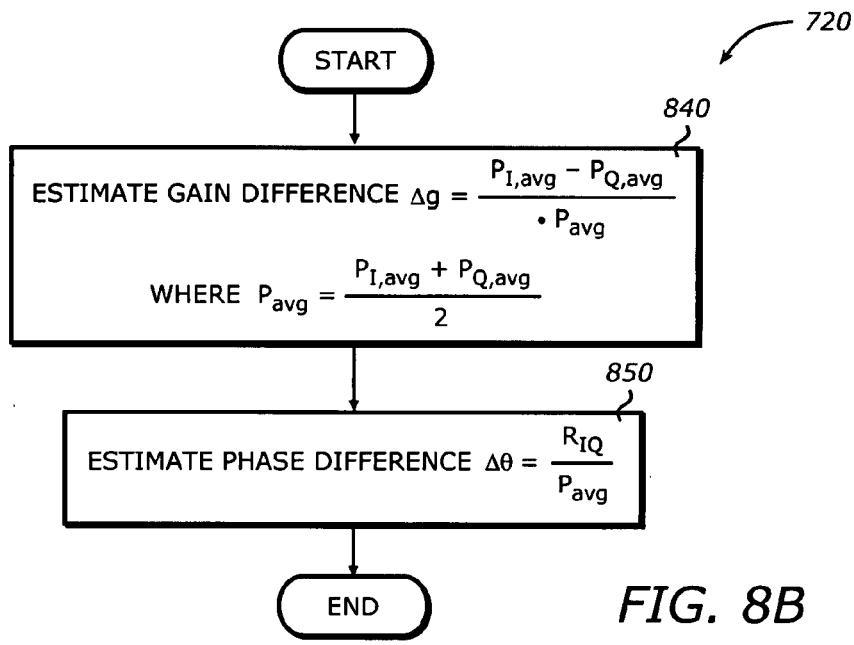
FIG. 8B is a flowchart illustrating a process to estimate gain and phase differences according to one embodiment of the invention.

FIG. 8B is a flowchart illustrating the process 720 to estimate gain and phase differences according to one embodiment of the invention.

Upon START, the process 720 estimates the gain difference $\Delta g$ as follows:

$$\Delta g = \frac{P_{I,avg} - P_{Q,avg}}{2 \cdot P_{avg}} \text{ where } P_{avg} = \frac{P_{I,avg} + P_{Q,avg}}{2} \quad (4)$$

The derivation of equation (4) is given later in the following. Next, the process 720 estimates the phase difference $\Delta \phi$ as follows:

$$\Delta \phi = \frac{R_{IQ}}{P_{avg}} \quad (5)$$

The derivation of equation (5) is given later in the following. The process 720 is then terminated.

Figure 8C:
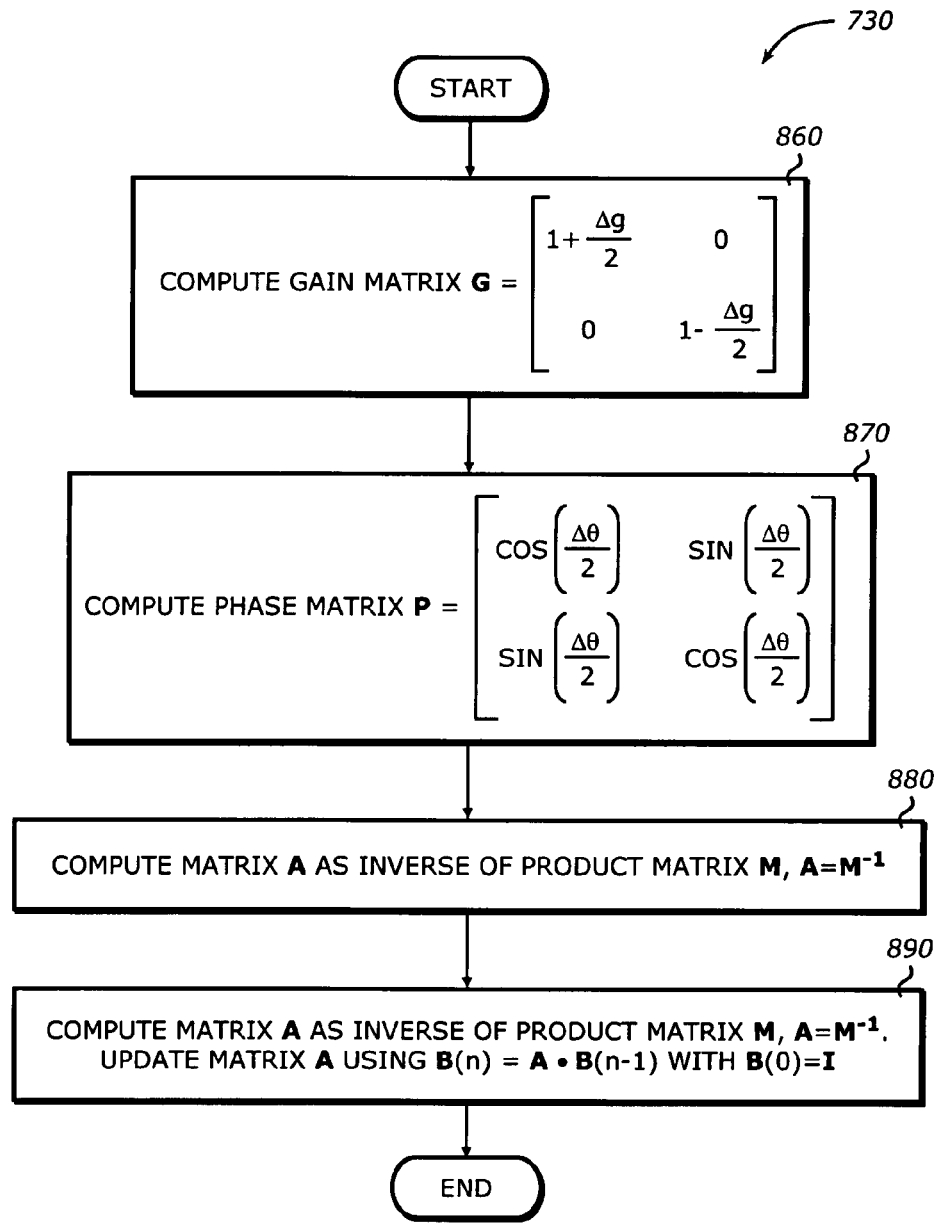
FIG. 8C is a flowchart illustrating a process to compute a matrix A of the adjustment constants according to one embodiment of the invention.

FIG. 8C is a flowchart illustrating the process 730 shown in FIG. 7 to compute a matrix A of the adjustment constants according to one embodiment of the invention.

Upon START, the process 730 computes the gain matrix G as follows using the gain difference $\Delta g$ as computed in equation (4).

$$G = \begin{bmatrix} 1 + \frac{\Delta g}{2} & 0 \\ 0 & 1 - \frac{\Delta g}{2} \end{bmatrix} \quad (6)$$

Next, the process 730 computes the phase matrix P as follows using the phase difference $\Delta \phi$ computed in equation (5).

$$P = \begin{bmatrix} \cos\left(\frac{\Delta \phi}{2}\right) & \sin\left(\frac{\Delta \phi}{2}\right) \\ \sin\left(\frac{\Delta \phi}{2}\right) & \cos\left(\frac{\Delta \phi}{2}\right) \end{bmatrix} \quad (7)$$

Then, the process 730 computes the product matrix M by multiplying matrices G and P as follows:

$$M = GP \quad (8)$$

Next, the process 730 computes matrix A as the inverse of the product matrix M computed in equation (8) as follows:

$$A = M^{-1} \quad (9)$$

The matrix $$A = \begin{bmatrix} a_{11} & a_{12} \\ a_{21} & a_{22} \end{bmatrix}$$

thus contains the components $a_{11}$, $a_{12}$, $a_{21}$, and $a_{22}$ which are the phase and gain adjustment constants or imbalance corrections to be used in the receiver compensator 160 (FIG. 1A) or transmitter compensator 220 (FIG. 2A)

The process 730 may also optionally update the matrix A by repeating the above computation and updating matrix A as follows:

$$B(n) = A \cdot B(n-1) \quad (10)$$

where B(0)=I, I is the identity matrix.

The process 730 is then terminated.

Equations (4) and (5) provide expressions for the computations of the phase and gain adjustments constants. These expressions may be derived in the following.

The I-Q imbalance is modeled using the following equation $$\begin{bmatrix} I' \\ Q' \end{bmatrix} = \begin{bmatrix} \left(1 + \frac{\Delta g}{2}\right)\cos\left(\frac{\Delta \phi}{2}\right) & \left(1 + \frac{\Delta g}{2}\right)\sin\left(\frac{\Delta \phi}{2}\right) \\ \left(1 - \frac{\Delta g}{2}\right)\sin\left(\frac{\Delta \phi}{2}\right) & \left(1 - \frac{\Delta g}{2}\right)\cos\left(\frac{\Delta \phi}{2}\right) \end{bmatrix} \begin{bmatrix} I \\ Q \end{bmatrix} \quad (11)$$

$$= \begin{bmatrix} 1+\frac{\Delta g}{2} & 0 \\ 0 & 1-\frac{\Delta g}{2} \end{bmatrix} \begin{bmatrix} \cos\left(\frac{\Delta\phi}{2}\right) & \sin\left(\frac{\Delta\phi}{2}\right) \\ \sin\left(\frac{\Delta\phi}{2}\right) & \cos\left(\frac{\Delta\phi}{2}\right) \end{bmatrix} \begin{bmatrix} I \\ Q \end{bmatrix}$$

Derivation of the Gain Adjustment Constant $\Delta g$ as Shown in Equation (4).

Assuming $\Delta\phi=0$, IQ imbalance is as follows, $$\begin{bmatrix} I' \\ Q' \end{bmatrix} = \begin{bmatrix} \left(1+\frac{\Delta g}{2}\right)\cos\left(\frac{\Delta\phi}{2}\right) & \left(1+\frac{\Delta g}{2}\right)\sin\left(\frac{\Delta\phi}{2}\right) \\ \left(1-\frac{\Delta g}{2}\right)\sin\left(\frac{\Delta\phi}{2}\right) & \left(1-\frac{\Delta g}{2}\right)\cos\left(\frac{\Delta\phi}{2}\right) \end{bmatrix} \begin{bmatrix} I \\ Q \end{bmatrix} \quad (12)$$

$$= \begin{bmatrix} 1+\frac{\Delta g}{2} & 0 \\ 0 & 1-\frac{\Delta g}{2} \end{bmatrix} \begin{bmatrix} I \\ Q \end{bmatrix}$$

$$I' = \left(1+\frac{\Delta g}{2}\right) \cdot I, \quad Q' = \left(1-\frac{\Delta g}{2}\right) \cdot Q \quad (13)$$

With these equations, the derivation is as follow, $$P_{I,avg} = E[I'^2] \quad (14)$$

$$= E\left[\left(1+\frac{\Delta g}{2}\right)^2 \cdot I^2\right]$$

$$= E\left[I^2 + \Delta g \cdot I^2 + \frac{\Delta g^2}{4} \cdot I^2\right]$$

$$= \left(1 + \Delta g + \frac{\Delta g^2}{4}\right) \cdot E[I^2]$$

$$P_{Q,avg} = E[Q'^2] \quad (15)$$

$$= E\left[\left(1+\frac{\Delta g}{2}\right)^2 \cdot Q^2\right]$$

$$= E\left[Q^2 - \Delta g \cdot Q^2 + \frac{\Delta g^2}{4} \cdot Q^2\right]$$

$$= \left(1 + \Delta g + \frac{\Delta g^2}{4}\right) \cdot E[Q^2]$$

$$P_{I,avg} - P_{Q,avg} = \Delta g \cdot E[I^2] + \Delta g \cdot E[Q^2] \quad \because E[I^2] = E[Q^2] \quad (16)$$

$$= 2 \cdot \Delta g \cdot E[I^2]$$

$$\cong 2 \cdot \Delta g \cdot \left(\frac{P_{I,avg} + P_{Q,avg}}{2}\right)$$

$$= 2 \cdot \Delta g \cdot P_{avg}$$

From equation (16), $\Delta g$ may be obtained:

$$\therefore \Delta g \cong \frac{P_{I,avg} - P_{Q,avg}}{2 \cdot P_{avg}} \quad (17)$$

Derivation of the Phase Adjustment Constant $\Delta\phi$ as Shown in Equation (5):

Assuming $\Delta g=0$ and $\Delta\phi \ll 1$, IQ imbalance is as follows:

$$\begin{bmatrix} I' \\ Q' \end{bmatrix} = \begin{bmatrix} \left(1+\frac{\Delta g}{2}\right)\cos\left(\frac{\Delta\phi}{2}\right) & \left(1+\frac{\Delta g}{2}\right)\sin\left(\frac{\Delta\phi}{2}\right) \\ \left(1-\frac{\Delta g}{2}\right)\sin\left(\frac{\Delta\phi}{2}\right) & \left(1-\frac{\Delta g}{2}\right)\cos\left(\frac{\Delta\phi}{2}\right) \end{bmatrix} \begin{bmatrix} I \\ Q \end{bmatrix} \quad (18)$$

$$= \begin{bmatrix} \cos\left(\frac{\Delta\phi}{2}\right) & \sin\left(\frac{\Delta\phi}{2}\right) \\ \sin\left(\frac{\Delta\phi}{2}\right) & \cos\left(\frac{\Delta\phi}{2}\right) \end{bmatrix} \begin{bmatrix} I \\ Q \end{bmatrix}$$

$$\cong \begin{bmatrix} 1 & \frac{\Delta\phi}{2} \\ \frac{\Delta\phi}{2} & 1 \end{bmatrix} \begin{bmatrix} I \\ Q \end{bmatrix}$$

which gives: $I' = I + \frac{\Delta\phi}{2} \cdot Q, \quad Q' = \frac{\Delta\phi}{2} \cdot I + Q$ \quad (19)

$R_{IQ}$ may be expressed as:

$$R_{IQ} = E[I' \cdot Q'] \quad (20)$$

$$= E\left[\left(I + \frac{\Delta\phi}{2} \cdot Q\right) \cdot \left(\frac{\Delta\phi}{2} \cdot I + Q\right)\right]$$

$$= E\left[\frac{\Delta\phi}{2} \cdot I^2 + I \cdot Q + \frac{\Delta\phi^2}{4} \cdot I \cdot Q + \frac{\Delta\phi}{2} \cdot Q^2\right]$$

$$= \frac{\Delta\phi}{2} \cdot E[(I^2 + Q^2)] + \frac{\Delta\phi^2}{4} \cdot E[I \cdot Q] \quad \because E[I \cdot Q] = 0$$

$$= \frac{\Delta\phi}{2} \cdot (E[I^2] + E[Q^2])$$

$$= \Delta\phi \cdot E[I^2] \quad \because E[I^2] = E[Q^2]$$

$$\cong \Delta\phi \cdot \left(\frac{P_{I,avg} + P_{Q,avg}}{2}\right)$$

$$= \delta\phi \cdot P_{avg}$$

which gives $\therefore \Delta\phi \cong \frac{R_{IQ}}{P_{avg}}$ \quad (21)

Figure 9:
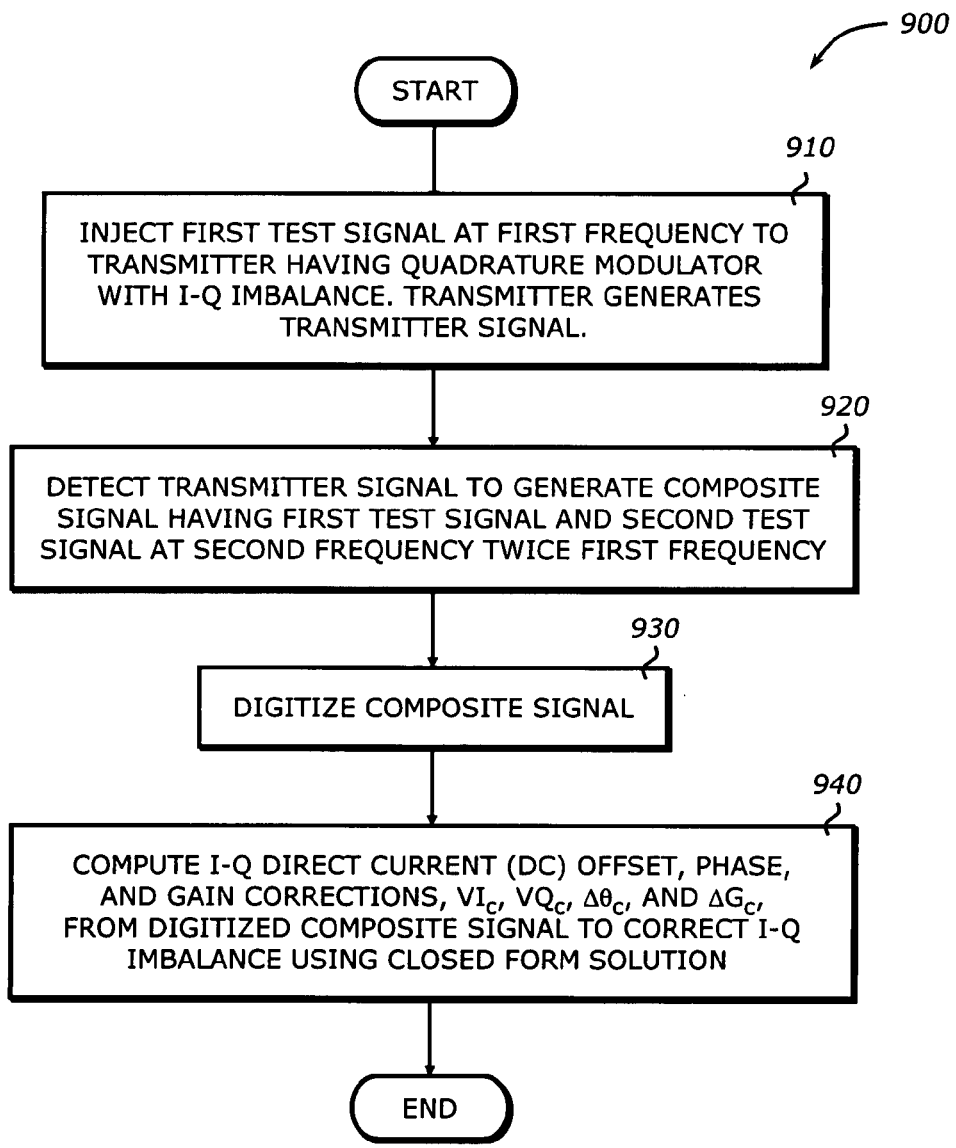
FIG. 9 is a flowchart illustrating a process to calibrate a transmitter without using a calibrated reference receiver according to one embodiment of the invention.

FIG. 9 is a flowchart illustrating a process 900 to calibrate a transmitter without using a calibrated reference receiver according to one embodiment of the invention.

Upon START, the process 900 injects a first test signal at a first frequency to a transmitter having a quadrature modulator with I-Q imbalance (Block 910). The quadrature modulator has a carrier frequency. The transmitter generates transmitter signal. Next, the process 900 detects the transmitter signal to generate a composite signal having the first test signal and a second test signal at a second frequency which is twice the first frequency (Block 920).

Then, the process 900 digitizes the composite signal (Block 930). This may be performed by a suitable ADC with a proper sampling frequency $f_s$. Next, the process 900 computes the I-Q DC offset, phase, and gain corrections, $VI_c$, $VQ_c$, $\Delta\phi_c$, and $\Delta G_c$, from digitized composite signal to correct I-Q imbalance using closed form solution (Block 940). The process 900 is then terminated.

Figure 10A:
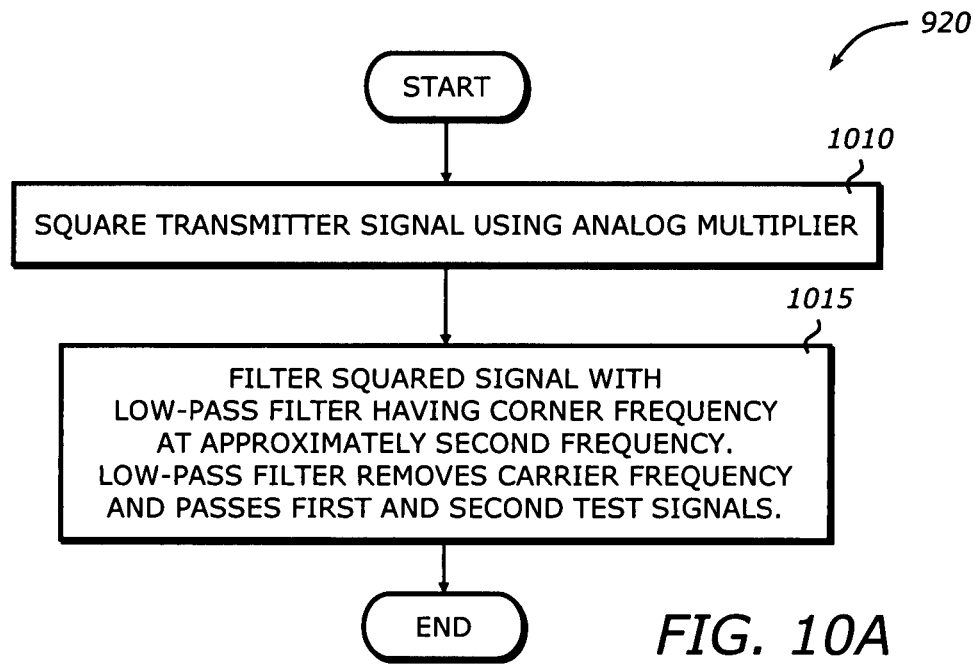
FIG. 10A is a flowchart illustrating a process to detect the transmitter signal according to one embodiment of the invention.
Figure 10B:
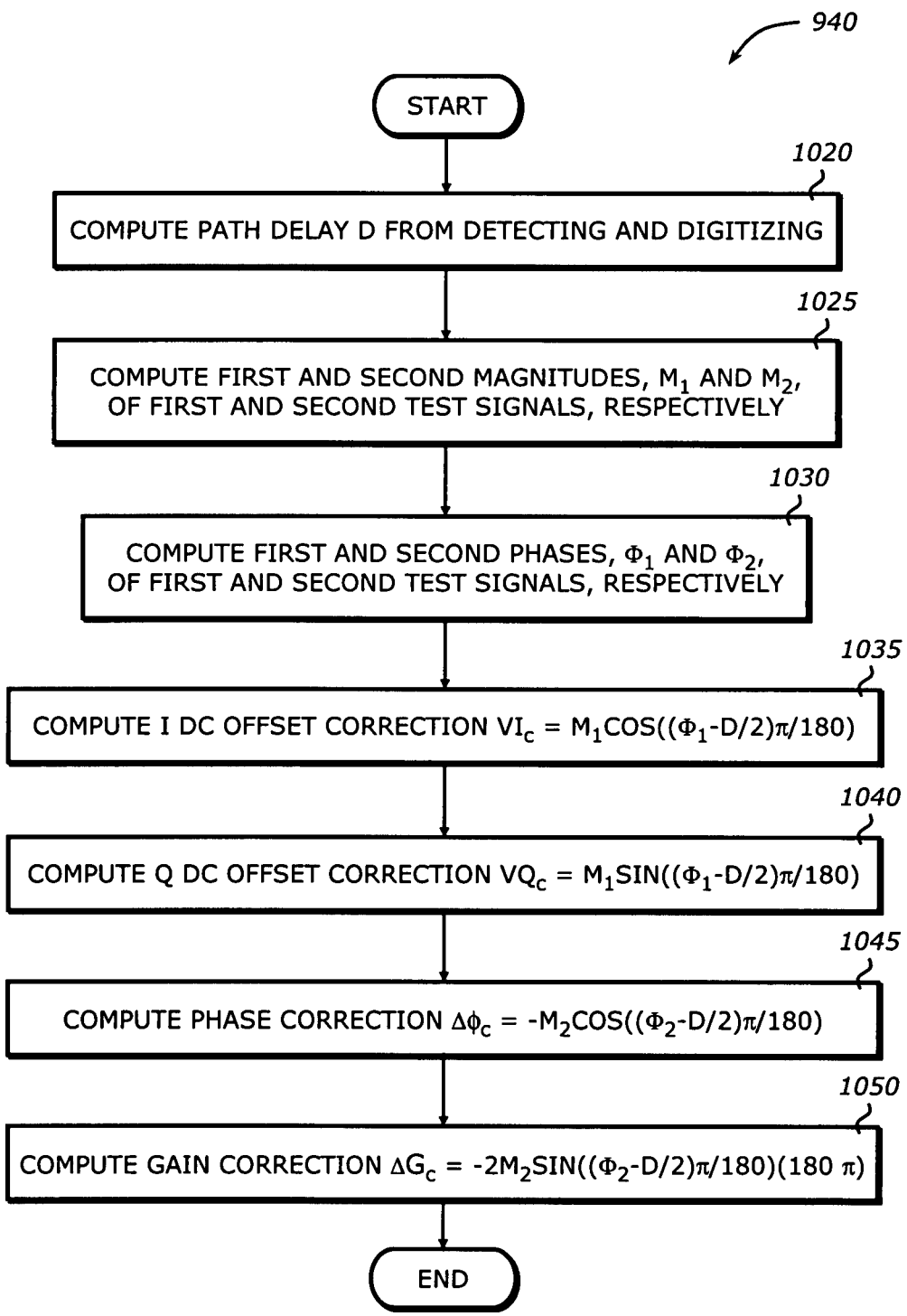
FIG. 10B is a flowchart illustrating a process to compute the I-Q DC offset, phase, and gain corrections according to one embodiment of the invention.

FIG. 10A is a flowchart illustrating the process 920 shown in FIG. 9 to detect transmitter signal according to one embodiment of the invention.

Upon START, the process 920 squares the transmitter signal using an analog multiplier (Block 1010). The squaring effectively introduces a second signal or tone appearing at twice the frequency of the first tone in the first test signal.

Next, the process 920 filters the squared signal with a low-pass filter having a corner frequency at approximately the second frequency (Block 1015). The low-pass filter removes the carrier frequency and passes first and second test signals. The process 920 is then terminated.

FIG. 10B is a flowchart illustrating the process 940 to compute the I-Q DC offset, phase, and gain corrections according to one embodiment of the invention.

Upon START, the process 940 computes a path delay D from the detecting and the digitizing, i.e., from the detector 380 to the ADC 390, (Block 1020). The path delay D is measured in degrees. This may be performed by setting the Q channel input to zero, i.e., setting the input $Q_1$, after the phase shifter 315 in FIG. 3, to zero, and run a calibration. The output of the phase of the second test signal, i.e., the second tone, is equal to the path delay D.

Next, the process 940 computes the first and second magnitudes, $M_1$ and $M_2$, of the first and second test signals, respectively (Block 1025). Then, the process 940 computes the first and second phases, $\Phi_1$ and $\Phi_2$, of the first and second test signals, respectively (Block 1030). Next, the process 940 computes the I DC offset correction $VI_c = M_1 \cos((\Phi_1-D/2)\pi/180)$ (Block 1035). Then, the process 940 computes the Q DC offset correction $VQ_c = -M_1 \sin((\Phi-D/2)\pi/180)$ (Block 1040). Next, the process 940 computes the phase correction $\Delta\phi_c = -M_2 \cos((\Phi_2-D/2)\pi/180)$ (Block 1045). Then, the process 940 computes the gain correction $\Delta G_c = -2 M_2 \sin((\Phi_2-D/2)\pi/180)(180/\pi)$ (Block 1050). The process 940 is then terminated.

The computations of the I-Q DC offset, phase, and gain corrections, $VI_c$, $VQ_c$, $\Delta\phi_c$, and $\Delta G_c$ are based on the transmitter and error circuit model as shown in FIG. 4. From the circuit model shown in FIG. 4, the equations of the I-Q components are obtained to provide the expressions for the I-Q DC offset, phase, and gain corrections, $VI_c$, $VQ_c$, $\Delta\phi_c$, and $\Delta G_c$.

| Let | | |
|---|---|---|
| i | be | I channel tone in volts |
| q | be | Q channel tone in volts |
| I | be | I channel after mixer in volts |
| Q | be | Q channel after mixer in volts |
| V | be | Output of transmitter in volts |
| $f_m$ | be | Modulation frequency |
| $f_c$ | be | Carrier frequency |
| $f_s$ | be | Sampling frequency in units of 100 ps |
| $\Delta t$ | be | Time in units of 100 ps |
| $\Delta S$ | be | Path delay in $\Delta t$ units |
| $VI_c$ | be | DC Offset I Correction in volts |
| $VQ_c$ | be | DC Offset Q Correction in volts |
| $\Delta G_c$ | be | Gain Imbalance Correction in volts |
| $\Delta\phi_c$ | be | Phase Imbalance Correction in degrees |
| $VI_P$ | be | DC Offset I Physical in volts |
| $VQ_P$ | be | DC Offset Q Physical in volts |
| $\Delta G_P$ | be | Gain Imbalance Physical in volts |
| $\Delta\phi_P$ | be | Phase Imbalance Physical in degrees |

The equations for the various quantities in the transmitter shown in FIG. 3

$$i = \cos((2\pi f_m/f_s)(\Delta t - \Delta S)) \quad (22a)$$

$$q = \sin((2\pi f_m/f_s)(\Delta t - \Delta S)) \quad (22b)$$

$$I = (i\cos((\Delta\phi_c\pi/180)/2) - q\sin((\Delta\phi_c\pi/180)/2))((1+\Delta G_c/2)/(1-\Delta G_c/2)) \quad (23a)$$

$$Q = (q\cos((\Delta\phi_c\pi/180)/2) - i\sin((\Delta\phi_c\pi/180)/2))((1-\Delta G_c/2)/(1+\Delta G_c/2)) \quad (23b)$$

$$V = (I - VI_c + VI_p)(1-\Delta G_p)\cos((2\pi f_c/f_s)(\Delta t - \Delta S) + (\Delta\phi_p\pi/180)/2) - (Q - VQ_c + VQ_p)(1+\Delta G_p)\sin((2\pi f_c/f_s)(\Delta t - \Delta S) - (\Delta\phi_p\pi/180)/2) \quad (24)$$

The equations for the corrections are:

$$VI_c = M_1 \cos((\Phi_1-D/2)\pi/180) \quad (25)$$

$$VQ_c = -M_1 \sin((\Phi_1-D/2)\pi/180) \quad (26)$$

$$\Delta\phi_c = -M_2 \cos((\Phi_2-D/2)\pi/180) \quad (27)$$

$$\Delta G_c = -2M_2 \sin((\Phi_2-D/2)\pi/180)(180/\pi) \quad (28)$$

where
$M_1$: Magnitude of the first test signal, or tone, in volts
$\Phi_1$: Phase of the first test signal, or tone, in degrees
$M_2$: Magnitude of the second test signal, or tone, in volts
$\Phi_2$: Phase of the second test signal, or tone, in degrees
D Path delay in degrees.

Figure 11:
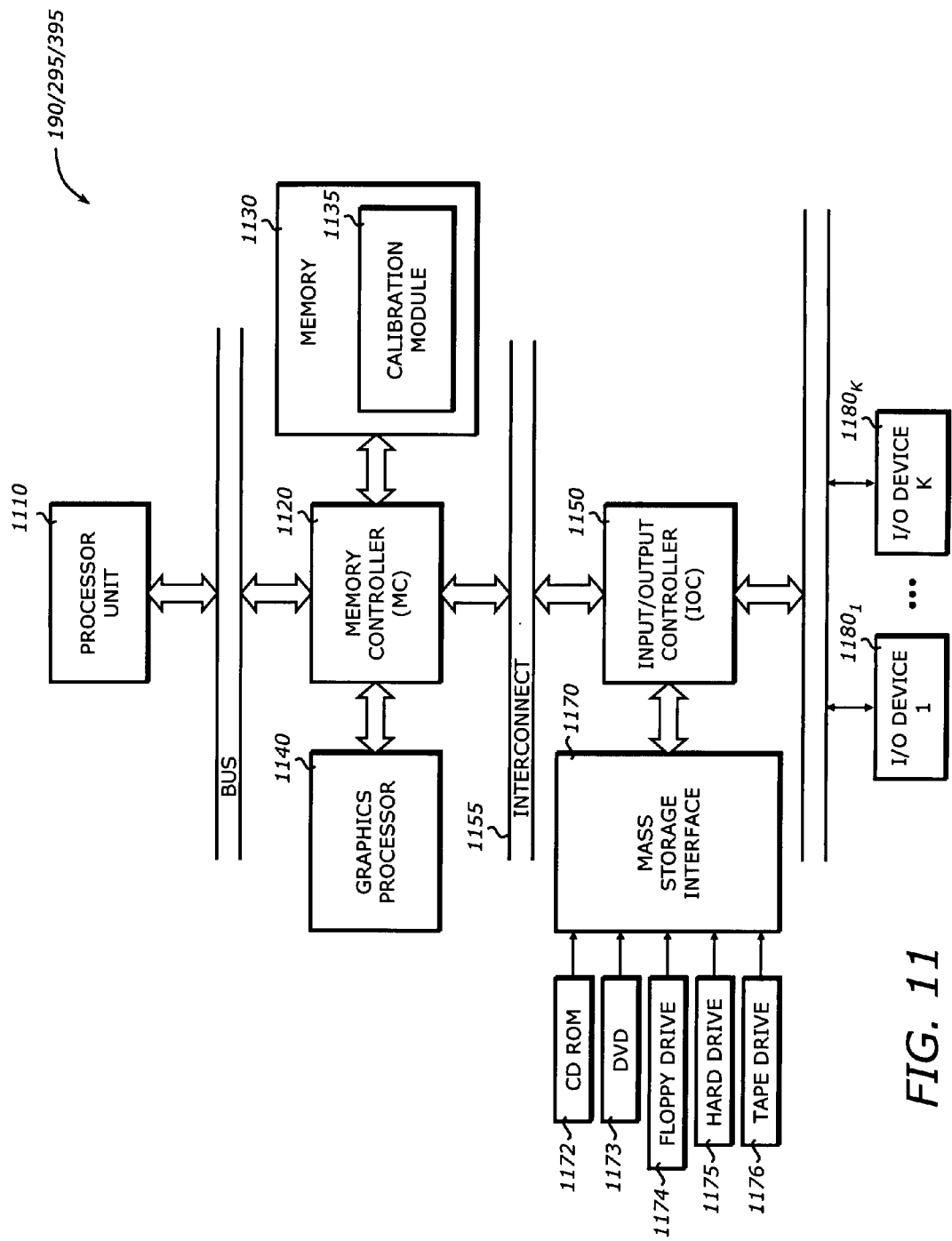
FIG. 11 is a diagram illustrating a processing unit according to one embodiment of the invention.

FIG. 11 is a diagram illustrating the processing units 190, 295, or 395, shown in FIGS. 1A, 2A, and 3, respectively, according to one embodiment of the invention. The processing unit 190/295/395 includes a processor unit 1110, a memory controller (MC) 1120, a main memory 1130, a graphics processor 1140, an input/output controller (IOC) 1150, an interconnect 1155, a mass storage interface 1170, and input/output (I/O devices 1180$_1$ to 1180$_K$. The processing unit 190/295/395 may contain more or less than the above components.

The processor unit 1110 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MC 1120 provides control and configuration of memory and input/output devices such as the main memory 1130 and the IOC 1140. The MC 1120 may be integrated into a chipset that integrates multiple functionalities such as graphics, media, isolated execution mode, host-to-peripheral bus interface, memory control, power management, etc. The MC 1120 or the memory controller functionality in the MCH 1120 may be integrated in the processor unit 1110. In some embodiments, the memory controller, either internal or external to the processor unit 1110, may work for all cores or processors in the processor unit 1110. In other embodiments, it may include different portions that may work separately for different cores or processors in the processor unit 1110.

The main memory 1130 stores system code and data. The main memory 1130 is typically implemented with dynamic random access memory (DRAM), static random access memory (SRAM), or any other types of memories including those that do not need to be refreshed. The main memory 1130 may include multiple channels of memory devices such as DRAMs. The main memory 1130 may include a calibration module 1135. The calibration module 1135 includes program instructions and data to perform the calibration functions as described above. The calibration module 1135 may include or interface to a suitable mathematical or signal processing software packages (e.g., MathLab) to perform computations of the adjustment constants or corrections.

The graphics processor 1140 is any processor that provides graphics functionalities. The graphics processor 1140 may also be integrated into the MC 1120 to form a Graphics and Memory Controller (GMC). The graphics processor 1140 may be a graphics card such as the Graphics Performance Accelerator (AGP) card, interfaced to the MC 1120 via a graphics port such as the Accelerated Graphics Port (AGP) or a peripheral component interconnect (PCI) Express interconnect. The graphics processor 1140 provides interface to an external display device such as standard progressive scan monitor, television (TV)-out device, and Transition Minimized Differential Signaling (TMDS) controller.

The IOC 1150 has a number of functionalities that are designed to support I/O functions. The IOC 1150 may also be integrated into a chipset together or separate from the MC 1120 to perform I/O functions. The IOC 1150 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc.

The interconnect or bus 1155 provides interface to peripheral devices. The interconnect 1155 may be point-to-point or connected to multiple devices. For clarity, not all interconnects are shown. It is contemplated that the interconnect 1155 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage interface 1170 interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include compact disk (CD) read-only memory (ROM) 1172, digital versatile disc (DVD) 1173, floppy drive 1174, hard drive 1175, tape drive 1176, and any other magnetic or optic storage devices. The mass storage device provides a mechanism to read machine-accessible media.

The I/O devices $1180_1$ to $1180_K$ may include any I/O devices to perform I/O functions. Examples of I/O devices $1180_1$ to $1180_K$ include controller for input devices (e.g., keyboard, mouse, trackball, pointing device, and remote control unit), media card (e.g., audio, video, and graphic), network card, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include information or data that, when accessed by a machine, cause the machine to perform the operations or actions described above. The machine accessible medium may also include program code embedded therein. The program code may include machine readable code to perform the operations described above. The term "information" or "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    storing N digitized samples I(n) and Q(n) representing in-phase and quadrature (I-Q) components, respectively, of a down-converted signal from a receiver, the I-Q components being generated from a quadrature demodulator or modulator having I-Q imbalance; and
    computing phase and gain adjustment constants from the N digitized samples to compensate for the I-Q imbalance using a closed form solution.

2. The method of claim 1 wherein computing the phase and gain adjustment constants comprises:

computing in-phase average power $P_{I,avg}$, quadrature average power $P_{Q,avg}$, and I-Q correlation $R_{IQ}$ from the N digitized samples I(n) and Q(n);

estimating a gain difference $\Delta g$ and a phase difference $\Delta \phi$ using the in-phase average power $P_{I,avg}$, the quadrature average power $P_{Q,avg}$, and the I-Q correlation $R_{IQ}$; and computing a matrix $$A = \begin{bmatrix} a_{111} & a_{12} \\ a_{21} & a_{22} \end{bmatrix}$$

using the gain difference $\Delta g$ and the phase difference $\Delta \phi$, the matrix A having components $a_{11}$, $a_{12}$, $a_{21}$, and $a_{22}$ being the phase and gain adjustment constants.

3. The method of claim 2 wherein computing the in-phase average power $P_{I,avg}$, the quadrature average power $P_{Q,avg}$, and the I-Q correlation $R_{IQ}$ comprises:

computing the in-phase average power $$P_{I,avg} = \frac{1}{N} \sum_{n=0}^{N-1} I(n)^2;$$

computing the quadrature average power $$P_{Q,avg} = \frac{1}{N} \sum_{n=0}^{N-1} Q(n)^2; \text{ and}$$

computing the I-Q correlation $$R_{IQ} = \frac{1}{N} \sum_{n=0}^{N-1} I(n)Q(n).$$

4. The method of claim 2 wherein estimating the gain difference $\Delta g$ and the phase difference $\Delta \phi$ comprises:

estimating the gain difference $$\Delta g = \frac{P_{I,avg} - P_{Q,avg}}{2 \cdot P_{avg}} \text{ where } P_{avg} = \frac{P_{I,avg} - P_{Q,avg}}{2 \cdot P_{avg}}; \text{ and}$$

estimating the phase difference $$\Delta \phi = \frac{R_{IQ}}{P_{avg}}.$$

5. The method of claim 2 wherein computing the matrix $$A = \begin{bmatrix} a_{11} & a_{12} \\ a_{21} & a_{22} \end{bmatrix}$$

comprises:

computing a gain matrix $$G = \begin{bmatrix} 1 + \frac{\Delta g}{2} & 0 \\ 0 & 1 - \frac{\Delta g}{2} \end{bmatrix};$$

computing a phase matrix $$P = \begin{bmatrix} \cos\left(\frac{\Delta \phi}{2}\right) & \sin\left(\frac{\Delta \phi}{2}\right) \\ \sin\left(\frac{\Delta \phi}{2}\right) & \cos\left(\frac{\Delta \phi}{2}\right) \end{bmatrix};$$

computing a product matrix M=GP; and computing the matrix A as inverse of the product matrix M, $A=M^{-1}$.

6. The method of claim 5 wherein computing the matrix A as the inverse of the product matrix comprises:

updating the matrix A using $B(n)=A \cdot B(n-1)$ with $B(0)=I$.

7. The method of claim 1 further comprising:

injecting a single un-modulated signal into the receiver having the quadrature demodulator to down convert the signal to base-band signal, the quadrature demodulator having the I-Q imbalance.

8. The method of claim 1 further comprising:

generating a signal in a transmitter having the quadrature modulator on a transmitter path with the I-Q imbalance;

looping the signal back into a receiver path of a calibrated reference receiver, the calibrated reference receiver having a receiver mixer to down convert the signal to base-band signal, the receiver mixer having been calibrated.

9. A method comprising:

injecting a first signal at a first frequency to a transmitter having a quadrature modulator with an in-phase and quadrature (I-Q) imbalance, the quadrature modulator having a carrier frequency, the transmitter generating a transmitter signal;

detecting the transmitter signal to generate a composite signal having the first signal and a second signal at a second frequency twice the first frequency;

digitizing the composite signal; and computing I-Q direct current (DC) offset, phase, and gain corrections, $VI_c$, $VQ_c$, $\Delta\phi_c$, and $\Delta G_c$, from the digitized composite signal to correct the I-Q imbalance using a closed form solution.

10. The method of claim 9 wherein detecting the transmitter signal comprises:

squaring the transmitter signal using an analog multiplier; and filtering the squared signal with a low-pass filter having a corner frequency at approximately the second frequency, the low-pass filter removing the carrier frequency and passing the first and second signals.

11. The method of claim 9 wherein computing the I-Q DC offset, phase, and gain corrections comprises:

computing a path delay D from detecting and digitizing;

computing first and second magnitudes, $M_1$ and $M_2$, of the first and second signals, respectively;

computing first and second phases, $\Phi_1$ and $\Phi_2$, of the first and second signals, respectively; and computing the I-Q DC offset, phase, and gain corrections, $VI_c$, $VQ_c$, $\Delta\phi_c$, and $\Delta G_c$, using the path delay D, the first and second magnitudes $M_1$ and $M_2$, and the first and second phases $\Phi_1$ and $\Phi_2$.

12. The method of claim 11 wherein computing the I-Q DC offset, phase, and gain corrections, $VI_c$, $VQ_c$, $\Delta\phi_c$, and $\Delta G_c$, comprises:

computing the I DC offset correction $VI_c = M_1 \cos((\Phi_1 - D/2)\pi/180)$;

computing the Q DC offset correction $VQ_c = -M_1 \sin((\Phi_1 - D/2)\pi/180)$;

computing the phase correction $\Delta\phi_c = -M_2 \cos((\Phi_2 - D/2)\pi/180)$; and computing the gain correction $\Delta G_c = -2M_2 \sin((\Phi_2 - D/2)\pi/180)(180/\pi)$.

13. An apparatus comprising:

a first adder to add a first product to a second product to produce a first in-phase (I) component in a communication path of a communication device, the communication path having a quadrature demodulator or modulator to translate frequency of a signal, the quadrature demodulator or modulator having I and quadrature (Q) imbalance;

a second adder to add a third product to a fourth product to produce a first quadrature (Q) component in the communication path;

first and second multipliers coupled to the first adder to multiply second I and Q components in the communication path with first and second adjustment constants, respectively, to produce the first and second products, respectively; and third and fourth multipliers coupled to the second adder to multiply the second I and Q components in the communication path with third and fourth adjustment constants, respectively, to produce the third and fourth products, respectively;

wherein the first, second, third, and fourth adjustment constants are computed using a closed form solution to compensate for the I-Q imbalance.

14. The apparatus of claim 13 wherein the communication path is a receiver path, the first I and Q components are corrected for the I-Q imbalance, and the second I and Q components are distorted by the I-Q imbalance.

15. The apparatus of claim 13 wherein the communication path is a transmitter path, the first I and Q components are pre-distorted for the I-Q imbalance, and the second I and Q components are correct.

16. An apparatus comprising:

a quadrature modulator circuit in a transmitter to generate a transmitter signal, the quadrature modulator circuit having in-phase and quadrature (I-Q) imbalance;

an error circuit coupled to the quadrature modulator circuit and I-Q digital-to-analog converters (DACs) to model the I-Q imbalance; and a pre-compensation circuit coupled to modulator in-phase and quadrature (I-Q) components of a modulator of the transmitter to generate pre-compensated I-Q components to the I-Q DACs, respectively, using compensation constants to compensate for the I-Q imbalance, the compensation constants being computed using a closed-form solution in calibration procedure.

17. The apparatus of claim 16 further comprising:

a detector coupled to the quadrature modulator circuit to generate a composite signal having first and second frequencies from the transmitter signal, the second frequency being twice the first frequency; and an analog-to-digital converter (ADC) coupled to the detector to provide digitized samples of the composite signal, the digitized samples being used to compute the compensation constants.

18. The apparatus of claim 16 wherein the quadrature modulator circuit comprises:

I-Q mixers to mix I-Q components with I-Q carrier wave components of a carrier wave signal to generate I-Q compensated components; and a combiner coupled to the I-Q mixers to combine the I-Q compensated components into the transmitter signal.

19. The apparatus of claim 18 wherein the error circuit comprises:

first and second adders to subtract I-Q DC offset compensation constants from corresponding outputs of the DACs to generates first and second differences, respectively;

first and second multipliers coupled to the first and second adders to multiply the first and second differences with negatives of I-Q gain compensation constants to produce I-Q inputs to the quadrature modulator circuit; and I-Q delay elements to provide I-Q phase errors to the I-Q carrier wave components.

20. The apparatus of claim 16 wherein the pre-compensation circuit comprises:

an I-Q gain imbalance circuit to generate I-Q gain pre-compensated components, the I-O gain imbalance circuit including I-Q gain multipliers to multiply the modulator I-Q components with I-Q gain compensation constants to produce the I-Q gain pre-compensated components;

an I-Q phase imbalance circuit coupled to the I-Q gain imbalance circuit to generate I-Q gain and phase pre-compensated components; and a direct current (DC) offset circuit coupled to the I-Q phase imbalance circuit to generate the imbalance pre-compensated I-Q components, the DC offset circuit including I-Q DC offset adders to add the I-Q gain and phase pre-compensated components to I-Q DC offset compensation constants to produce the imbalance pre-compensated I-Q components.

21. The apparatus of claim 18 wherein the I-Q phase imbalance circuit comprises:

a first adder to add a first product to a second product to produce the I gain and phase pre-compensated component;

a second adder to add a third product to a fourth product to produce the Q gain and phase pre-compensated component;

first and second multipliers coupled to the first adder to multiply the I-Q gain pre-compensated components with I-Q phase compensation constants, respectively, to produce the first and second products, respectively; and third and fourth multipliers coupled to the second adder to multiply the Q-I components with the I-Q phase compensation constants, respectively, to produce the third and fourth products, respectively.

22. An article of manufacture comprising:

a machine-accessible non-transitory storage medium including code segments that, when executed by a processor, cause the processor to perform operations comprising:

storing N digitized samples $I(n)$ and $Q(n)$ representing in-phase and quadrature (I-Q) components, respectively, of a down-converted signal from a receiver, the I-Q components being generated from a quadrature demodulator or modulator having I-Q imbalance; and computing phase and gain adjustment constants from the N digitized samples to compensate for the I-Q imbalance using a closed form solution.

23. The article of manufacture of claim 22 wherein the code segments causing the processor to perform computing the phase and gain adjustment constants comprise code segments that, when executed by the processor, cause the processor to perform operations comprising:

computing in-phase average power $P_{I,avg}$, quadrature average power $P_{Q,avg}$, and I-Q correlation $R_{IQ}$ from the N digitized samples I(n) and Q(n);

estimating a gain difference $\Delta g$ and a phase difference $\Delta\phi$ using the in-phase average power $P_{I,avg}$, the quadrature average power $P_{Q,avg}$, and the I-Q correlation $R_{IQ}$; and computing a matrix $$A = \begin{bmatrix} a_{11} & a_{12} \\ a_{21} & a_{22} \end{bmatrix}$$

using the gain difference $\Delta g$ and the phase difference $\Delta\phi$, the matrix A having components $a_{11}$, $a_{12}$, $a_{21}$, and $a_{22}$ being the phase and gain adjustment constants.

24. The article of manufacture of claim 23 wherein the code segments causing the processor to perform computing the in-phase average power $P_{I,avg}$, the quadrature average power $P_{Q,avg}$, and the I-Q correlation $R_{IQ}$ comprise code segments that, when executed by the processor, cause the processor to perform operations comprising:

computing the in-phase average power $$P_{I,avg} = \frac{1}{N}\sum_{n=0}^{N-1} I(n)^2;$$

computing the quadrature average power $$P_{Q,avg} = \frac{1}{N}\sum_{n=0}^{N-1} Q(n)^2;$$

and computing the I-Q correlation $$R_{IQ} = \frac{1}{N}\sum_{n=0}^{N-1} I(n)Q(n).$$

25. The article of manufacture of claim 23 wherein the code segments causing the processor to perform estimating the gain difference $\Delta g$ and the phase difference $\Delta\phi$ comprise code segments that, when accessed by the processor, cause the processor to perform operations comprising:

estimating the gain difference $$\Delta g = \frac{P_{I,avg} - P_{Q,avg}}{2 \cdot P_{avg}} \text{ where } P_{avg} = \frac{P_{I,avg} + P_{Q,avg}}{2}; \text{ and}$$

estimating the phase difference $$\Delta\phi = \frac{R_{IQ}}{P_{avg}}.$$

26. The article of manufacture of claim 23 wherein the code segments causing the processor to perform computing the matrix $$A = \begin{bmatrix} a_{11} & a_{12} \\ a_{21} & a_{22} \end{bmatrix}$$

comprise code segments that, when executed by the processor, cause the processor to perform operations comprising:

computing a gain matrix $$G = \begin{bmatrix} 1+\frac{\Delta g}{2} & 0 \\ 0 & 1-\frac{\Delta g}{2} \end{bmatrix};$$

computing a phase matrix $$P = \begin{bmatrix} \cos\left(\frac{\Delta\phi}{2}\right) & \sin\left(\frac{\Delta\phi}{2}\right) \\ \sin\left(\frac{\Delta\phi}{2}\right) & \cos\left(\frac{\Delta\phi}{2}\right) \end{bmatrix};$$

computing a product matrix M=GP; and computing the matrix A as inverse of the product matrix M, $A=M^{-1}$.

27. The article of manufacture of claim 26 wherein the code segments causing the processor to perform computing the matrix A as the inverse of the product matrix comprise code segments that, when executed by a machine, cause the processor to perform operations comprising:

updating the matrix A using B(n)=A·B(n−1) with B(0)=I.

28. The article of manufacture of claim 22 wherein the information further comprises information that, when accessed by a machine, cause the machine to perform operations comprising:

injecting a single un-modulated signal into the receiver having the quadrature demodulator to down convert the signal to base-band signal, the quadrature demodulator having the I-Q imbalance.

29. The article of manufacture of claim 22 wherein the code segments further comprise code segments that, when executed by the processor, cause the processor to perform operations comprising:

generating a signal in a transmitter having the quadrature modulator on a transmitter path with the I-Q imbalance;

looping the signal back into a receiver path of a calibrated reference receiver, the calibrated reference receiver having a receiver mixer to down convert the signal to baseband signal, the receiver mixer having been calibrated.

30. An article of manufacture comprising:

a machine-accessible non-transitory storage medium including code segments that, when executed by the processor, cause the processor to perform operations comprising:

injecting a first signal at a first frequency to a transmitter having a quadrature modulator with an in-phase and quadrature (I-Q) imbalance, the quadrature modulator having a carrier frequency, the transmitter generating a transmitter signal;

detecting the transmitter signal to generate a composite signal having the first signal and a second signal at a second frequency twice the first frequency;

digitizing the composite signal; and computing I-Q direct current (DC) offset, phase, and gain corrections, $VI_c$, $VQ_c$, $\Delta\phi_c$, and $\Delta G_c$, from the digitized composite signal to correct the I-Q imbalance using a closed form solution.

31. The article of manufacture of claim 30 wherein the code segments causing the processor to perform detecting the transmitter signal comprise code segments that, when executed by the processor, cause the processor to perform operations comprising:

squaring the transmitter signal using an analog multiplier; and filtering the squared signal with a low-pass filter having a corner frequency at approximately the second frequency, the low-pass filter removing the carrier frequency and passing the first and second signals.

32. The article of manufacture of claim 30 wherein the code segments causing the processor to perform computing the I-Q DC offset, phase, and gain corrections comprise code segments that, when executed by the processor, cause the processor to perform operations comprising:

computing a path delay D from detecting and digitizing;

computing first and second magnitudes, $M_1$ and $M_2$, of the first and second signals, respectively;

computing first and second phases, $\Phi_1$ and $\Phi_2$, of the first and second signals, respectively; and computing the I-Q DC offset, phase, and gain corrections, $VI_c$, $VQ_c$, $\Delta\phi_c$, and $\Delta G_c$, using the path delay D, the first and second magnitudes $M_1$ and $M_2$, and the first and second phases $\Phi_1$ and $\Phi_2$.

33. The article of manufacture of claim 32 wherein the code segments causing the processor to perform computing the I-Q DC offset, phase, and gain corrections, $VI_c$, $VQ_c$, $\Delta\phi_c$, and $\Delta G_c$, comprise code segments that, when executed by the processor, cause the processor to perform operations comprising:

computing the I DC offset correction $VI_c = M_1 \cos((\Phi_1 - D/2)\pi/180)$;

computing the Q DC offset correction $VQ_c = -M_1 \sin((\Phi_1 - D/2)\pi/180)$;

computing the phase correction $\Delta\phi_c = -M_2 \cos((\Phi_2 - D/2)\pi/180)$; and computing the gain correction $\Delta G_c = -2M_2 \sin((\Phi_2 - D/2)\pi/180)(180/\pi)$.

34. A system comprising:

a quadrature demodulator to down-convert a radio frequency (RF) signal received at a receiver subsystem, the quadrature demodulator providing analog in-phase and quadrature (I-Q) components that have I-Q imbalance, the quadrature demodulator having mixers;

analog-to-digital converters (ADCs) coupled to the quadrature demodulator to convert the I-Q components into digital I-Q components; and a compensator coupled to the ADCs to compensate the I-Q imbalance, the compensator comprising:

a first adder to add a first product to a second product to produce an output I component, a second adder to add a third product to a fourth product to produce an output Q component, first and second multipliers coupled to the first adder to multiply the digital I and Q components with first and second adjustment constants, respectively, to produce the first and second products, respectively, and third and fourth multipliers coupled to the second adder to multiply the digital I and Q components with third and fourth adjustment constants, respectively, to produce the third and fourth products, respectively;

wherein the first, second, third, and fourth adjustment constants are computed using a closed form solution to compensate for the I-Q imbalance.

35. A system comprising:

a quadrature modulator to up-convert analog in-phase and quadrature (I-Q) components of a base-band signal to a transmitting signal, the quadrature modulator having mixers that generate I-Q imbalance;

digital-to-analog converters (DACs) coupled to the quadrature modulator to convert pre-compensated I-Q components to the analog I-Q components; and a compensator coupled to the DACs to compensate for the I-Q imbalance from modulator I-Q components, the compensator comprising:

a first adder to add a first product to a second product to produce the pre-compensated I component, a second adder to add a third product to a fourth product to produce the pre-compensated Q component, first and second multipliers coupled to the first adder to multiply the modulator I and Q components with first and second adjustment constants, respectively, to produce the first and second products, respectively, and third and fourth multipliers coupled to the second adder to multiply the modulator I and Q components with third and fourth adjustment constants, respectively, to produce the third and fourth products, respectively;

wherein the first, second, third, and fourth adjustment constants are computed using a closed form solution to compensate for the I-Q imbalance.

36. The system of claim 35 further comprising:

a calibrated reference receiver coupled to the quadrature modulator to provide a loop-backed path for computation of the I-Q imbalance.

* * * * *